US012798333B2

(12) United States Patent
Shinoda et al.

(10) Patent No.: US 12,798,333 B2
(45) Date of Patent: Nov. 17, 2026

(54) HEATER ELEMENT AND VEHICLE AIR CONDITIONING SYSTEM

(71) Applicant: NGK INSULATORS, LTD., Nagoya-City (JP)

(72) Inventors: Narimasa Shinoda, Ichinomiya (JP); Hirotaka Saito, Komaki (JP); Takafumi Hamada, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 517 days.

(21) Appl. No.: 18/528,952

(22) Filed: Dec. 5, 2023

(65) Prior Publication Data

US 2024/0227506 A1 Jul. 11, 2024

(30) Foreign Application Priority Data

Jan. 10, 2023 (JP) ................................. 2023-001894

(51) Int. Cl.
*B60H 1/22* (2006.01)

(52) U.S. Cl.
CPC ................................. *B60H 1/2225* (2013.01)

(58) Field of Classification Search
CPC ........ B60H 1/2225; H05B 3/141; H05B 3/03; H05B 3/50; H05B 3/262; H05B 2203/017; H05B 2203/013; H05B 2203/02; H05B 3/36; H05B 1/0238; H05B 1/028; H05B 2203/029; H05B 2203/006; H05B 3/02; H05B 2203/023; H05B 2203/016
USPC ....... 219/202, 204, 206, 207, 217, 242, 505, 219/540, 541, 543, 546, 553
See application file for complete search history.

(56) References Cited

U.S. PATENT DOCUMENTS

| | | | | |
|---|---|---|---|---|
| 4,232,214 A * | 11/1980 | Shioi | H01C 7/022 219/541 |
| 6,124,570 A * | 9/2000 | Ebner | F24H 1/009 219/202 |
| 2020/0223293 A1 | 7/2020 | Matsumoto et al. | |

(Continued)

FOREIGN PATENT DOCUMENTS

| | | |
|---|---|---|
| JP | H06-275367 A | 9/1994 |
| JP | 2020-104774 A | 7/2020 |
| JP | 2020-111282 A | 7/2020 |

(Continued)

OTHER PUBLICATIONS

Japanese Office Action for Japanese Application No. 2023-001894 dated Jun. 16, 2026.

*Primary Examiner* — Phuong T Nguyen
(74) *Attorney, Agent, or Firm* — Muncy, Geissler, Olds & Lowe, P.C.

(57) ABSTRACT

A heater element includes: a honeycomb structure; a negative electrode; a positive electrode; and a functional material-containing layer. The honeycomb structure includes an outer peripheral wall and partition walls disposed on an inner side of the outer peripheral wall, the partition walls defining a plurality of cells, each of the cells extending from an inlet end face to an outlet end face to form a flow path, at least the partition walls being made of a material having a PTC property. The functional material-containing layer includes at least a dehumidifying material, the functional material-containing layer being provided on surfaces of the partition walls.

13 Claims, 10 Drawing Sheets

(56) References Cited

U.S. PATENT DOCUMENTS

| | | | | |
|---|---|---|---|---|
| 2021/0041141 | A1* | 2/2021 | Miyairi | F24H 3/0435 |
| 2024/0270055 | A1 | 8/2024 | Miyairi et al. | |

FOREIGN PATENT DOCUMENTS

| | | | |
|---|---|---|---|
| JP | 7754938 | B2 | 10/2025 |
| WO | 2020/036067 | A1 | 2/2020 |

* cited by examiner

HEATER ELEMENT AND VEHICLE AIR CONDITIONING SYSTEM

CROSS REFERENCE TO RELATED APPLICATIONS

The present invention claims the benefit of priority to Japanese Patent Application No 2023-001894 filed on Jan. 10, 2023 with the Japanese Patent Office, the entire contents of which are incorporated herein by reference in its entirety.

FIELD OF THE INVENTION

The present invention relates to a heater element and a vehicle air conditioning system.

BACKGROUND OF THE INVENTION

In various types of vehicles such as automobiles, there are increasing requirements for improvement of vehicle interior environment. Specific requirements include reduction of an amount of $CO_2$ in the vehicle interior to suppress driver's drowsiness, control of humidity in the vehicle interior, and removal of harmful volatile components such as odor components and allergy-causing components in the vehicle interior. The effective measure for such requirements includes ventilation, but the ventilation causes a large loss of heater energy in winter, leading to a decreased energy efficiency in winter. In particular, a battery electric vehicle (BEV) has a problem that its cruising range is significantly reduced due to its energy loss.

As a method for solving the above problem, Patent Literatures 1 and 2 disclose a vehicle air conditioning system in which components to be removed such as $CO_2$ and water vapor in the air in the vehicle interior are trapped by a functional material such as an adsorbent, and the components to be removed are then allowed to react or desorbed by heating to discharge them to the outside of the vehicle and regenerate the functional material. Such a vehicle air conditioning system requires more contact between the air and the functional material in order to ensure the performance of trapping the components to be removed, and the ability of the functional material to be heated to a predetermined temperature in order to facilitate the regeneration of the functional material. The regeneration can be carried out, for example, by removing substances adsorbed on the functional material through an oxidation reaction, and by desorbing and releasing the substances adsorbed on the functional material, but both cases require the heating of the functional material at an appropriate temperature depending on the adsorbed substances.

On the other hand, Patent Literature 3 discloses a heater element, including: a pillar shaped honeycomb structure having an outer peripheral wall and partition walls disposed on an inner side of the outer peripheral wall and defining a plurality of cells forming flow paths from a first end face to a second end face, wherein the partition walls have a PTC property, the partition walls have an average thickness of 0.13 mm or less, and the first end face and the second end face have an opening ratio of 0.81 or more. This heater element is used for heating a vehicle interior, and is an efficient heating means because the honeycomb structure allows the heating area to be increased. Therefore, the use of such a heater element as a support for the functional material can contribute to the shortening of the regeneration time of the functional material. In particular, it is believed that since this heater element can be heated by electric conduction and has a PTC property, it can easily heat the functional material, while suppressing excessive heat generation and thermal deterioration of the functional material. Further, since the risk of excessive temperature is avoided, safety can be ensured even if small initial resistance is set to increase a heating rate, and the temperature can be increased in a short period of time.

However, when a functional material-containing layer is provided on the surfaces of the partition walls that define the cells of the heater element as described in Patent Literature 3, the temperature near the inlet side of the heater element is difficult to be increased, and the region in the extending direction of the flow path where the functional material can effectively be heated in the cells becomes narrower. In other words, a part of the functional material supported on the heater element has a low regeneration efficiency and cannot be effectively utilized. Further, when the functional material is a catalyst, heating may be required for activation of the catalyst, but if the temperature of the supported catalyst is insufficient, the catalyst cannot be effectively used. The provision of the functional material-containing layer that cannot be effectively utilized will be a factor which will lower the cost performance of the heater element.

Since electrodes for heating the heater element are provided on the first end face and the second end face of the honeycomb structure, it is believed that the region in the extending direction of the flow path where the functional material can be efficiently heated can be widened by having an electrode structure provided with a pair of electrodes on the first end face and the second end face of the honeycomb structure as well as to extend to a part of the partition walls in the extending direction of the flow path from the first end face and the second end face.

However, when the functional material-containing layer is provided on surfaces of the partition walls defining the cells of the heater element having such an electrode structure and of the electrodes on the partition walls, the electrical resistance tends to increase with long-term use as compared to a case where the functional material-containing layer is not provided.

Since the oxidation of the electrodes is thought to be a cause of the increase in the electrical resistance, it is considered that the surfaces of the electrodes are protected by plating or the like. However, the plating on the surfaces of the electrodes increases the costs and also thickens the electrodes due to the plating, resulting in easy clogging of the cells.

The present invention has been made to solve the problems as described above. An object of the present invention is to provide an inexpensive heater element which does not easily increase the electrical resistance even if it is used for a long period of time, while widening a region in an extending direction of a flow path where a functional material can effectively be heated.

Also, another object of the present invention is to provide a vehicle air conditioning system including such a heater element.

PRIOR ART

Patent Literatures

[Patent Literature 1] Japanese Patent Application Publication No. 2020-104774 A

[Patent Literature 2] Japanese Patent Application Publication No. 2020-111282 A

[Patent Literature 3] WO 2020/036067 A1

SUMMARY OF THE INVENTION

As a result of intensive studies for the structure of the heater element, the present inventors have obtained the following findings:

When an operation where trapping and releasing of components to be removed such as moisture by the functional material-containing layer are repeated for a long period of time, the moisture tends to remain in the functional material-containing layer on the inlet side. The moisture trapped in the functional material-containing layer forms water droplets or water vapor due to changes in ambient temperature and humidity, and adheres to and remains in the electrode on the inlet side, making the electrode on the inlet side susceptible to deterioration. On the other hand, since the moisture is difficult to remain in the functional material-containing layer on the outlet side, the electrode on the outlet side is difficult to be deteriorated.

Based on the above findings, the present inventors have discovered that the above problems can be solved by setting the electrode on the inlet side to a negative electrode and the electrode on the outlet side to a positive electrode, and they have completed the present invention. That is, the present invention is illustrated as follows:

(1)

A heater element, comprising:

- a honeycomb structure comprising an outer peripheral wall and partition walls disposed on an inner side of the outer peripheral wall, the partition walls defining a plurality of cells, each of the cells extending from an inlet end face to an outlet end face to form a flow path, at least the partition walls being made of a material having a PTC property;
- a negative electrode comprising a negative electrode portion A1 provided on the inlet end face, and a negative electrode portion B1 connected to the negative electrode portion A1 and provided on surfaces of the partition walls in an extending direction of the flow path from the inlet end face;
- a positive electrode comprising a positive electrode portion A2 provided on the outlet end face, and a positive electrode portion B2 connected to the positive electrode portion A2 and provided on surfaces of the partition walls in the extending direction of the flow path from the outlet end face; and
- a functional material-containing layer comprising at least a dehumidifying material, the functional material-containing layer being provided on surfaces of the partition walls where the negative electrode portion B1 and the positive electrode portion B2 are not provided, and on surfaces of the negative electrode portion B1 and the negative electrode portion B2.

(2)

The heater element according to (1), wherein the functional material-containing layer is also provided on surfaces of at least part of the negative electrode portion A1 and the positive electrode portion A2.

(3)

The heater element according to (2), wherein a thickness of the functional material-containing layer provided on the surface of the positive electrode portion A2 is greater than that of the functional material-containing layer provided on the surface of the negative electrode portion A1.

(4)

The heater element according to (2) or (3), wherein the thickness of the functional material-containing layer provided on the surface of the negative electrode portion A1 is 300 μm or less.

(5)

The heater element according to any one of (1) to (4), wherein the partition walls of the honeycomb structure have a thickness of 80 to 500 μm.

(6)

The heater element according to any one of (1) to (5), wherein the negative electrode and the positive electrode are made of a material containing one or more selected from aluminum, stainless steel, nickel, silver, and copper.

(7)

The heater element according to any one of (1) to (6), wherein the material having the PTC property comprises a material containing barium titanate as a main component, the material being substantially free of lead.

(8)

The heater element according to any one of (1) to (7), wherein the functional material-containing layer further comprises a functional material capable of adsorbing one or more selected from carbon dioxide and volatile components.

(9)

The heater element according to any one of (1) to (8), further comprising terminals provided on the surfaces of at least part of the negative electrode portion A1 and the positive electrode portion A2.

(10)

The heater element according to (9), wherein the terminals are made of a material containing one or more selected from aluminum, stainless steel, nickel, silver, and copper.

(11)

A vehicle air conditioning system, comprising:

the heater element according to any one of (1) to (10);

- a power supply for applying a voltage to the heater element;
- an inflow pipe for communicating a vehicle interior with the inlet end face of the heater element;
- an outflow pipe for communicating the outlet end face of the heater element with the vehicle interior and a vehicle exterior; and
- a switching valve provided in the outflow pipe, the switching valve being capable of switching a flow of an air flowing through the outflow pipe to the vehicle interior or the vehicle exterior.

(12)

The vehicle air conditioning system according to (11), further comprising a ventilator for causing the air from the vehicle interior to flow into the inlet end face of the heater element through the inflow pipe.

(13)

The vehicle air conditioning system according to (11) or (12), further comprising a control unit capable of executing switching between:

- a first mode wherein the voltage applied from the power supply is turned off, and the switching valve is switched such that the air flowing through the outflow pipe flows into the vehicle interior; and
- a second mode wherein the voltage applied from the power supply is turned on, and the switching valve is switched such that the air flowing through the outflow pipe flows to the vehicle exterior.

DETAILED DESCRIPTION OF THE INVENTION

Figure 1A:
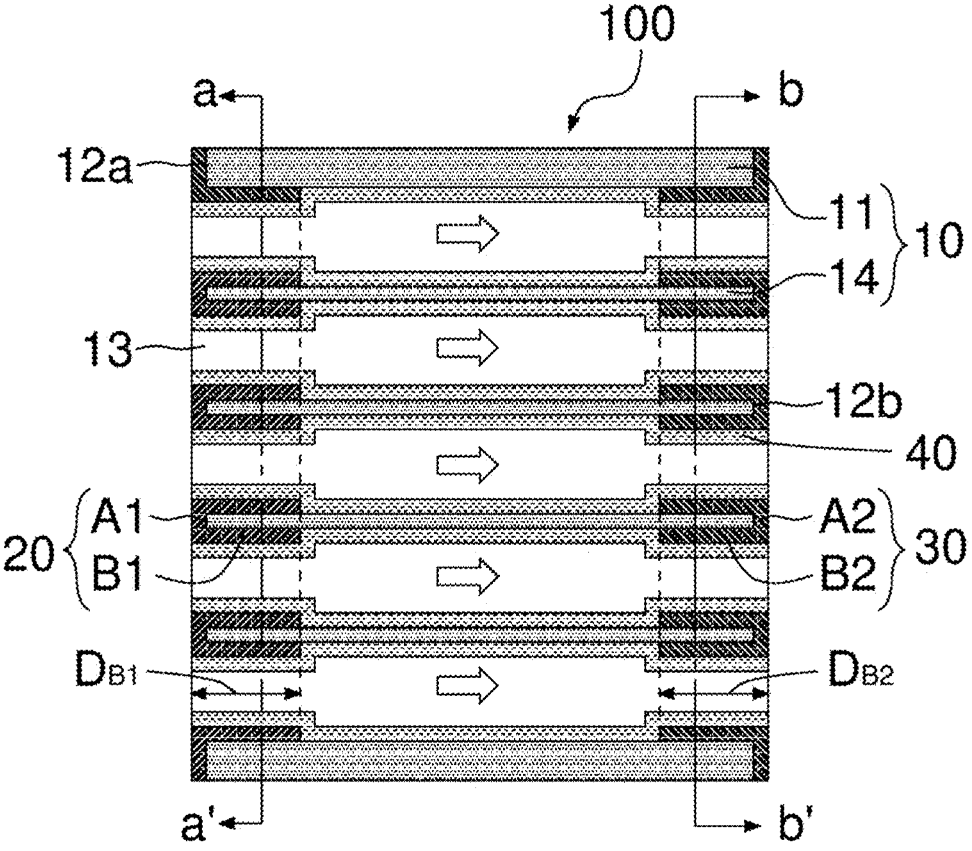
FIG. 1A is a schematic view of a cross section of a heater element according to an embodiment of the invention, which is parallel to an extending direction of cells (flow path)

A heater element according to an embodiment of the present invention includes: a honeycomb structure having an outer peripheral wall and partition walls disposed on an inner side of the outer peripheral wall, the partition walls defining a plurality of cells, each of the cells extending from an inlet end face to an outlet end face to form a flow path, at least the partition walls being made of a material having a PTC property; a negative electrode including a negative electrode portion A1 provided on the inlet end face, and a negative electrode portion B1 connected to the negative electrode portion A1 and provided on surfaces of the partition walls in an extending direction of the flow path from the inlet end face; a positive electrode including a positive electrode portion A2 provided on the outlet end face, and a positive electrode portion B2 connected to the positive electrode portion A2 and provided on surfaces of the partition walls in the extending direction of the flow path from the outlet end face; and a functional material-containing layer including at least a dehumidifying material, the functional material-containing layer being provided on surfaces of the partition walls where the negative electrode portion B1 and the positive electrode portion B2 are not provided, and on surfaces of the negative electrode portion B1 and the negative electrode portion B2. According to a structure, it is possible to widen a region in the extending direction of the flow path where the functional material can be effectively heated. Further, since the moisture will be difficult to remain in the functional material-containing layer on the inlet side, any deterioration of the electrodes (negative electrode) on the inlet side can be prevented, and electrical resistance will be difficult to increase even if it is used for a long period of time. Furthermore, since no plating is required for the surfaces of the electrodes, the clogging of the cells can be suppressed while reducing costs.

Hereinafter, embodiments of the present invention will be specifically described with reference to the drawings. It is to understand that the present invention is not limited to the following embodiments, and those which have appropriately added changes, improvements and the like to the following embodiments based on knowledge of a person skilled in the art without departing from the spirit of the present invention fall within the scope of the present invention.

(1. Heater Element)

The heater element according to an embodiment of the present invention can be suitably utilized as a heater element for use in a vehicle air conditioning system for various vehicles such as automobiles. The vehicle includes, but not limited to, automobiles and trains. Non-limiting examples of the automobile include a gasoline vehicle, a diesel vehicle, a gas fuel vehicle using CNG (a compressed natural gas) or LNG (a liquefied natural gas), a fuel cell vehicle, an electric vehicle, and a plug-in hybrid vehicle. The heater element according to the embodiment of the present invention can be suitably used for vehicles having no internal combustion engine, in particular, electric vehicles and electric railcars.

Figure 1B:
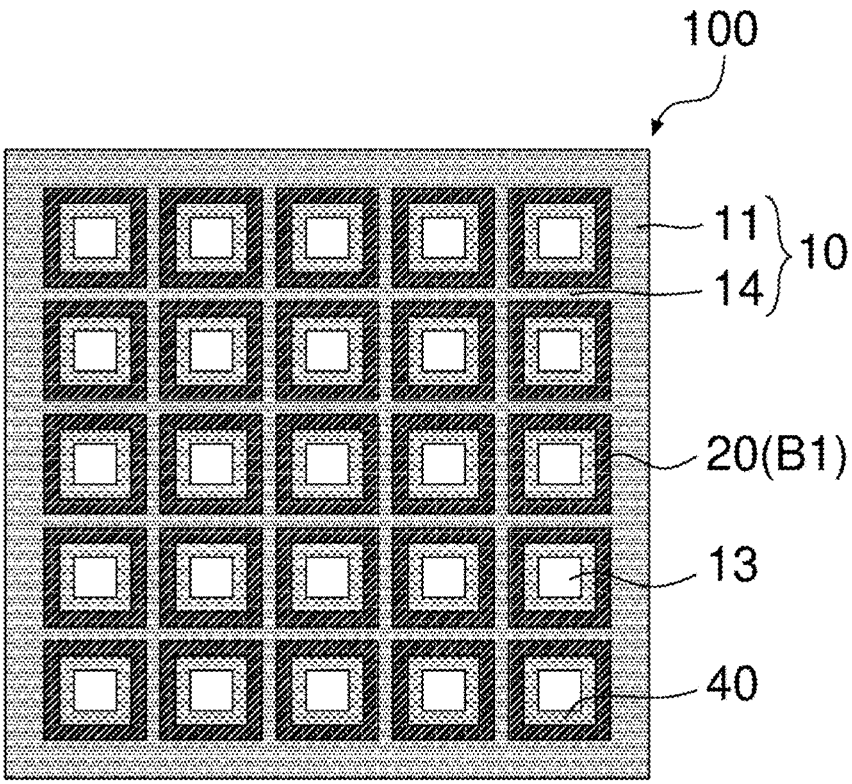
FIG. 1B is a schematic cross-sectional view taken along the line a-a' in FIG. 1A.

FIG. 1A is a schematic view of a cross section of a heater element according to an embodiment of the invention, which is parallel to an extending direction of cells (flow path). Further, FIG. 1B is a schematic cross-sectional view taken along the line a-a' in FIG. 1A. It should be noted that the cross section taken along the line b-b' in FIG. 1A is omitted because the negative electrode portion B1 of the negative electrode 20 in FIG. 1B is simply replaced by the positive electrode portion B2 of the positive electrode 30.

As shown in FIGS. 1A and 1B, a heater element 100 includes: a honeycomb structure 10; a negative electrode 20; a positive electrode 30; and a functional material-containing layer 40. The honeycomb structure 10 has an outer peripheral wall 11 and partition walls 14 disposed on an inner side of the outer peripheral wall 11 and defining a plurality of cells 13 to form flow paths extending from an inlet end face 12*a* to an outlet end face 12*b*. The negative electrode 20 includes a negative electrode portion A1 provided on the inlet end face 12*a*, and a negative electrode portion B1 connected to the negative electrode portion A1 and provided on surfaces of the partition walls 14 in the extending direction of the flow path from the inlet end face 12*a*. The positive electrode 30 includes a positive electrode portion A2 provided on the outlet end face 12*b*, and a positive electrode portion B2 connected to the positive electrode portion A2 and provided on the surfaces of the partition walls 14 in the extending direction of the flow path from the outlet end face 12*b*. The functional material-containing layer 40 is provided on the surfaces of the partition walls 14 where the negative electrode portion B1 and the negative electrode portion B2 are not provided, the negative electrode portion B1, and the positive electrode portion B2.

As used herein, the "inlet end face 12*a*" refers to the end face on the side where the air flows into the honeycomb structure 10 forming the heater element 100, and the "outlet end face 12*b*" refers to the end face on the side where the air flows out from the honeycomb structure 10 forming the heater element 100. Furthermore, the white arrows in the heater element 100 represent the flow of the air flowing through the heater element 100.

Figure 2:
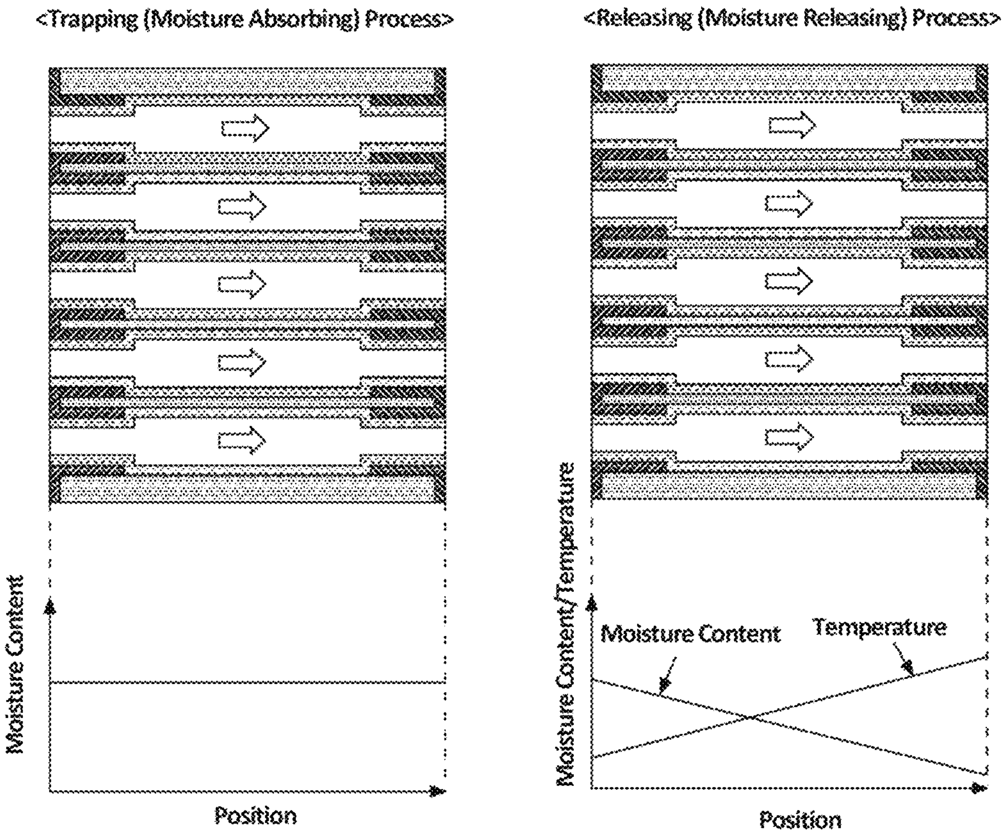
FIG. 2 is a graph for explaining a moisture content and a temperature of a functional material-containing layer during a trapping (moisture absorbing) process and a releasing (moisture releasing) process of components to be removed including moisture for a heater element according to an embodiment of the invention.

FIG. 2 is a graph for explaining a moisture content and a temperature of the functional material-containing layer 40 during a trapping (moisture absorbing) process and a releasing (moisture releasing) process of components to be removed containing moisture for the heater element 100.

In the trapping (moisture absorbing) process, the moisture is trapped (moisture-absorbed) in the functional material-containing layer 40 by circulating the air containing the components to be removed such as moisture through the heater element 100. An amount of moisture (moisture content) trapped in the functional material-containing layer 40 depends on an amount of a moisture absorbent contained in the functional material-containing layer 40. Therefore, if the moisture absorbent contained in the functional material-containing layer 40 is uniform in the extending direction of the flow path extend, the amount of trapped moisture will also be substantially the same in the extending direction of the flow path.

In the releasing (moisture releasing) process, the trapped moisture is desorbed and released (moisture-released) to the outside of the heater element 100 by passing electricity between the negative electrode 20 and the positing electrode 30 and heating them. Based on the flow direction of the air flowing through the heater element 100, the functional material-containing layer 40 on the upstream side has a lower temperature because it is in contact with unheated air, whereas the functional material-containing layer 40 on the downstream side tends to have a higher temperature because it is in contact with heated air. Therefore, the trapped moisture tends to remain in the functional material-containing layer 40 on the upstream side, and the moisture content in the functional material-containing layer 40 tends to gradually decrease toward the downstream side.

Each member forming the heater element 100 will be described below in detail.

(1-1. Honeycomb Structure)

The shape of the honeycomb structure 10 is not particularly limited. For example, an outer shape of a cross section of the honeycomb structure 10 orthogonal to the flow path direction (the extending direction of the cells 13) can be polygonal such as quadrangular (rectangular, square), pentagonal, hexagonal, heptagonal, and octagonal, circular, oval (egg-shaped, elliptical, elliptic, rounded rectangular, etc.), or the like. The end faces (inlet end face 12*a* and outlet end face 12*b*) have the same shape as the cross section. Also, when the cross section and the end faces are polygonal, the corners may be chamfered.

The shape of each cell 13 is not particularly limited, but it may be polygonal such as quadrangular, pentagonal, hexagonal, heptagonal, and octagonal, circular, or oval in the cross section of the honeycomb structure 10 orthogonal to the flow path direction. These shapes may be single or in combination of two or more. Moreover, among these shapes, the quadrangle or the hexagon is preferable. By providing the cells 13 having such a shape, it is possible to reduce the pressure loss when the air flows. FIGS. 1A and 1B show, as an example, a honeycomb structure 10 in which the outer shape of the cross section and the shape of each cell 13 are quadrangular in the cross section orthogonal to the flow path direction.

The honeycomb structure 10 may be a honeycomb joined body having a plurality of honeycomb segments and joining layers that join outer peripheral side surfaces of the plurality of honeycomb segments together. The use of the honeycomb joined body can increase the total cross-sectional area of the cells 13, which will be important for ensuring the flow rate of air while suppressing cracking.

It should be noted that the joining layer can be formed by using a joining material. The joining material is not particularly limited, but a ceramic material obtained by adding a solvent such as water to form a paste can be used. The joining material may contain a material having a PTC (Positive Temperature Coefficient) property, or may contain the same material as the outer peripheral wall 11 and the partition walls 14. In addition to the role of joining the honeycomb segments to each other, the joining material can also be used as an outer peripheral coating material after joining the honeycomb segments.

The thickness of the partition walls 14 is not particularly limited, but it is preferably 80 to 500 μm, and more preferably 100 to 450 μm, and even more preferably 120 to 400 μm. By controlling the thickness of the partition walls 14 within such a range, any pressure loss when the air flows through the cells 13 can be easily reduced while ensuring the strength of the honeycomb structure 10. Further, it becomes easy to ensure a sufficient amount of the functional material supported and a sufficient contact area with the air flowing inside the cells 13.

As used herein, the thickness of the partition walls 14 refers to a length of a line segment that is across the partition wall 14 when connecting the centers of gravity of adjacent cells 13 with the line segment in the cross section orthogonal to the flow path direction. The thickness of the partition walls 14 refers to an average thickness of all the partition walls 14.

Although the thickness of the outer peripheral wall 11 is not particularly limited, it is preferably determined based on the following viewpoints. First, from the viewpoint of reinforcing the honeycomb structure 10, the thickness of the outer peripheral wall 11 is preferably 0.05 mm or more, and more preferably 0.06 mm or more, and even more preferably 0.08 mm or more. On the other hand, the thickness of the outer peripheral wall 11 is preferably 1.0 mm or less, and more preferably 0.5 mm, and more preferably 0.4 mm or less, and still more preferably 0.3 mm or less, from the viewpoint of suppressing the initial current by increasing the electrical resistance and from the viewpoint of reducing the pressure loss when the air flows through the cells.

As used herein, the thickness of the outer peripheral wall 11 refers to a length from a boundary between the outer peripheral wall 11 and the outermost cell 13 or the partition wall 14 to a side surface of the honeycomb structure 10 in a normal line direction of the side surface in the cross section orthogonal to the flow path direction.

The cell density is not particularly limited, but it is preferably 2.54 to 140 cells/$cm^2$, and more preferably 15 to 100 cells/$cm^2$, and even more preferably 20 to 90 cells/$cm^2$. By controlling the cell density within such a range, the pressure loss when the air flows through the cells 13 can be easily reduced while ensuring the strength of the honeycomb structure 10.

As used herein, the cell density refers to a value obtained by dividing a number of cells by an area of one end face (inlet end face 12*a* or outlet end face 12*b*) of the honeycomb structure 10 (the total area of the partition walls 14 and the cells 13 excluding the outer peripheral wall 11).

The cell pitch is not particularly limited, but it is preferably 1.0 to 2.0 mm, and more preferably 1.1 to 1.8 mm, and still more preferably 1.2 to 1.6 mm. By controlling the cell pitch within such a range, the pressure loss when the air flows through the cells 13 can be easily reduced while ensuring the strength of the honeycomb structure 10.

As used herein, the cell pitch refers to a value obtained by the following calculation. First, the area of one end face (inlet end face 12*a* or outlet end face 12*b*) of the honeycomb structure 10 (the total area of the partition walls 14 and the cells 13 excluding the outer peripheral wall 11) is divided by the number of the cells to calculate an area per a cell. A square root of the area per a cell is then calculated, and this is determined to be the cell pitch.

The opening ratio of the cells 13 is not particularly limited, but it is preferably 0.80 to 0.94%, and more preferably 0.83 to 0.92%, and even more preferably 0.85 to 0.90. By controlling the opening ratio within such a range, the pressure loss when the air flows through the cells 13 can be easily reduced while ensuring the strength of the honeycomb structure 10.

As used herein, the opening ratio of the cells 13 refers a value obtained by dividing the total area of the cells 13 defined by the partition walls 14 by the area of one end face 12*b* (inlet end face 12*a* or outlet end face 12*b*) (the total area of the partition walls 14 and the cells 13 excluding the outer peripheral wall 11) in the cross section orthogonal to the flow path direction of the honeycomb structure 10. It should be noted that when calculating the opening ratio of the cells 13, the negative electrode 20, the positive electrode 30, and the functional material-containing layer 40 are not taken into account.

The length of the honeycomb structure 10 in the flow path direction and the cross-sectional area orthogonal to the flow path direction may be adjusted according to the required size of the heater element 100, and are not particularly limited. For example, when used in a compact heater element 100 while ensuring a predetermined function, the honeycomb structure 10 can have a length of 2 to 20 mm in the flow path direction and a cross-sectional area of 10 $cm^2$ or more orthogonal to the flow path direction. Although the upper limit of the cross-sectional area orthogonal to the flow path direction is not particularly limited, it is, for example, 300 $cm^2$.

The partition walls 14 forming the honeycomb structure 10 are made of a material that can be heated by electric conduction, specifically made of a material having the PTC property. Further, the outer peripheral wall 11 may also be made of the material having the PTC property, as with the partition walls 14, as needed. By such a configuration, the functional material-containing layer 40 can be heated by heat transfer from the heat-generating partition walls 14 (and optionally the outer peripheral wall 11). Further, the material having the PTC property has characteristics such that when the temperature increases to exceed the Curie point, the resistance value is sharply increased, resulting in a difficulty for electricity to flow. Therefore, when the temperature of the heater element 100 becomes high, the partition walls 14 (and the outer peripheral wall 11 if necessary) limit the current flowing through them, thereby suppressing excessive heat generation of the heater element 100. Therefore, it is possible to suppress thermal deterioration of the functional material-containing layer 40 due to excessive heat generation.

The lower limit of the volume resistivity at 25° C. of the material having the PTC property is preferably 0.5 Ω·cm or more, and more preferably 1 Ω·cm or more, and even more preferably 5 Ω·cm or more, from the viewpoint of obtaining appropriate heat generation. The upper limit of the volume resistivity at 25° C. of the material having the PTC property is preferably 20 Ω·cm or less, and more preferably 18 Ω·cm or less, and even more preferably 16 Ω·cm or less, from the viewpoint of generating heat with a low driving voltage. As used herein, the volume resistivity at 25° C. of the material having the PTC property is measured according to JIS K 6271:2008.

From the viewpoints that can be heated by electric conduction and has the PTC property, the outer peripheral wall 11 and the partition walls 14 are preferably made of a material containing barium titanate ($BaTiO_3$) as a main component. Also, this material is more preferably ceramics made of a material containing barium titanate ($BaTiO_3$)-based crystals as a main component in which a part of Ba is substituted with a rare earth element. As used herein, the term "main component" means a component in which a proportion of the component is more than 50% by mass of the total component. The content of $BaTiO_3$-based crystalline particles can be determined by fluorescent X-ray analysis. Other crystalline particles can also be measured by the same method.

The compositional formula of $BaTiO_3$-based crystalline particles, in which a part of Ba is substituted with the rare earth element, can be expressed as $(Ba_{1-x}A_x)TiO_3$. In the compositional formula, the symbol A represents at least one rare earth element, and $0.001 \le x \le 0.010$.

The symbol A is not particularly limited as long as it is the rare earth element, but it may preferably be one or more selected from the group consisting of La, Ce, Pr, Nd, Eu, Gd, Dy, Ho, Er, Y and Yb, and more preferably La. The x value is preferably 0.001 or more, and more preferably 0.0015 or more, in terms of suppressing excessively high electrical resistance at room temperature. On the other hand, x is preferably 0.009 or less, in terms of preventing the electrical resistance at room temperature from becoming too high due to insufficient sintering.

The content of the $BaTiO_3$-based crystalline particles in which a part of Ba is substituted with the rare earth element in the ceramics is not particularly limited as long as it is determined to be the main component, but it may preferably be 90% by mass or more, and more preferably 92% by mass or more, and even more preferably 94% by mass or more. The upper limit of the content of the $BaTiO_3$-based crystalline particles is not particularly limited, but it may generally be 99% by mass, and preferably 98% by mass.

The content of the $BaTiO_3$-based crystalline particles can be measured by fluorescent X-ray analysis. Other crystalline particles can be measured in the same manner as this method.

In terms of reduction of the environmental load, it is desirable that the materials used for the outer peripheral wall 11 and the partition walls 14 are substantially free of lead (Pb). More particularly, the outer peripheral wall 11 and the partition walls 14 preferably have a Pb content of 0.01% by mass or less, and more preferably 0.001% by mass or less, and still more preferably 0% by mass. The lower Pb content can allow the air heated by contact with the heat-generating partition walls 14 to be safely applied to organisms such as humans, for example. In the outer peripheral wall 11 and the partition walls 14, the Pb content is preferably less than 0.03% by mass, and more preferably less than 0.01% by mass, and further preferably 0% by mass, as converted to PbO. The lead content can be determined by ICP-MS (inductively coupled plasma mass spectrometry).

The material making up the outer peripheral wall 11 and the partition walls 14 preferably have a lower limit of a Curie point of 100° C. or more, and more preferably 110° C. or more, and even more preferably 125° C. or more, in terms of efficiently heating the air. Further, the upper limit of the Curie point is preferably 250° C. or more, and preferably 225° C. or more, and even more preferably 200° C. or more, and still more preferably 150° C. or more, in terms of safety as a component placed in the vehicle interior or near the vehicle interior.

The Curie point of the material making up the outer peripheral wall 11 and the partition walls 14 can be adjusted by the type of shifter and an amount of the shifter added. For example, the Curie point of barium titanate ($BaTiO_3$) is about 120° C., but the Curie point can be shifted to the lower temperature side by substituting a part of Ba and Ti with one or more of Sr, Sn and Zr.

As used herein, the Curie point is measured by the following method. A sample is attached to a sample holder for measurement, mounted in a measuring tank (e.g., MINI-SUBZERO MC-810P, from ESPEC), and a change in electrical resistance of the sample as a function of a temperature change when the temperature is increased from 10° C. is measured using a DC resistance meter (e.g., Multimeter 3478A, from YOKOGAWA HEWLETT PACKARD, LTD.). Based on an electrical resistance-temperature plot obtained by the measurement, a temperature at which the resistance value is twice the resistance value at room temperature (20° C.) is defined as the Curie point.

(1-2. Negative Electrode and Positive Electrode)

The negative electrode 20 is provided on the inlet end face 12*a* side of the honeycomb structure 10, and the positive electrode 30 is provided on the outlet end face 12*b* side of the honeycomb structure 10.

The negative electrode 20 includes a negative electrode portion A1 provided on the inlet end face 12*a*, and a negative electrode portion B1 connected to the negative electrode portion A1 and provided on the surfaces of the partition walls 14 in the extending direction of the flow path from the inlet end face 12*a*. The positive electrode 30 includes a positive electrode portion A2 provided on the outlet end face 12*b*, and a positive electrode portion B2 connected to the positive electrode portion A2 and provided on the surfaces of the partition walls 14 in the extending direction of the flow path from the outlet end face 12*b*.

As shown in FIG. 2, the moisture tends to remain on the inlet end face 12*a* side during the releasing (humidity releasing) process, but as described above, the negative electrode 20 that is easily deteriorated due to oxidation is placed on the inlet end face 12*a* side, and the positive electrode 30 that is difficult to be deteriorated due to oxidation is placed on the outlet end face 12*b* side, whereby the deterioration due to oxidation of the negative electrode 20 can be suppressed even if the moisture adheres to and remains on the inlet end face 12*a* side, so that the electrical resistance will be difficult to increase even if the heater element 100 is used for a long period of time. Further, the distance between the negative electrode 20 and the positive electrode 30 in the extending direction of the flow path can be shortened as compared to the case where the negative electrode 20 and the positive electrode 30 are provided only on the inlet end face 12*a* and the outlet end face 12*b*, respectively. When the distance between the negative electrode 20 and the positive electrode 30 is shortened, the electric resistance is lowered, so that it is also possible to widen the region in the extending direction of the flow path, which can be effectively heated.

A flow path direction length $D_{B1}$ of the negative electrode portion B1 and a flow path direction length $D_{B2}$ of the positive electrode portion B2 are not particularly limited, but as they are longer, the distance between the negative electrode 20 and the positive electrode 30 can be shortened. Therefore, each of the flow path direction lengths $D_{B1}$ and $D_{B2}$ is preferably 1/200 or more, more preferably 1/100 or more, even more preferably 1/50 or more, of the length of the honeycomb structure 10 in the extending direction of the flow path. However, each of the flow path direction lengths $D_{B1}$ and $D_{B2}$ is preferably less than ½, more preferably ⅓ or less, even more preferably ¼ or less, of the length of the honeycomb structure 10 in the extending direction of the flow path, because the distance that can be heated due to heat conduction is limited, and the negative electrode portion B1 and the positive electrode portion B2 may become contacted to cause a short circuit.

In the heater element 100, the air flows through the cells 13 with the inlet end face 12*a* being on the upstream side and the outlet end face 12*b* being on the downstream side. In this case, the upstream portion of the heater element 100 is cooled by the cold inflow air, while the downstream portion is not cooled because the inflow air is heated. Therefore, since the downstream portion is sufficiently heated by heat conduction, the downstream portion can be sufficiently heated even if current does not flow through the honeycomb structure 10 in the downstream portion and electricity flows through the electrodes provided in the extending direction of the flow path. Therefore, it is preferable that the flow path direction length $D_{B2}$ of the positive electrode portion B2 is longer than the flow path direction length $D_{B1}$ of the negative electrode portion B1, because the region in the extending direction of the flow path where the functional material-containing layer 40 can be effectively heated can be further widened.

The flow path direction length $D_{B1}$ of the negative electrode portion B1, and the flow path direction length $D_{B2}$ of the positive electrode portion B2 are measured by the following procedure.

First, a cross-sectional image of the heater element 100 at magnifications of about 50 is acquired using a scanning electron microscope or the like. The cross section is a cross section parallel to the flow path direction of the honeycomb structure 10 as illustrated in FIG. 1A. Moreover, the cross section is made to pass through the center of gravity in the cross section orthogonal to the flow path of the honeycomb structure 10.

Subsequently, when the flow path direction length $D_{B1}$ of the negative electrode portion B1 is determined, all the lengths of the negative electrode portions B1 in the flow path direction in the cross-sectional image are determined, and an average value thereof is determined. Also, when the flow path direction length $D_{B2}$ of the positive electrode portion B2 is determined, all the lengths of the positive electrode portions B2 in the flow path direction in the cross-sectional image are determined, and an average value thereof is determined.

By applying a voltage between the negative electrode 20 and the positive electrode 30, the heat can be generated in the honeycomb structure 10 by Joule heat. Each of the negative electrode 20 and the positive electrode 30 may have an extending portion extending toward the outside of the honeycomb structure 10. The provision of the extending portion can facilitate connection with a terminal or the like, which is in charge of connection with the outside.

Each of the negative electrode 20 and the positive electrode 30 may be made of, for example, a material (a metal or alloy) containing one or more selected from aluminum Al, stainless steel (SUS), nickel (Ni), silver (Ag) and copper (Cu), although not particularly limited thereto. It is also possible to use an ohmic electrode capable of ohmic contact with the outer peripheral wall 11 and/or the partition walls 14 which have the PTC property. The ohmic electrode may employ an ohmic electrode containing, for example, at least one selected from Al, Au, Ag and In as a base metal, and containing at least one selected from Ni, Si, Zn, Ge, Sn, Se and Te for n-type semiconductors as a dopant. Further, each of the negative electrode 20 and the positive electrode 30 may have a single-layer structure, or may have a laminated structure of two or more layers. When each of the negative electrode 20 and the positive electrode 30 has the laminated structure of two or more layers, the materials of the respective layers may be of the same type or of different types.

The thickness of each of the negative electrode 20 and the positive electrode 30 is not particularly limited, and it may be appropriately set according to the method for forming the negative electrode 20 and the positive electrode 30. The method for forming the negative electrode 20 and the positive electrode 30 includes metal deposition methods such as sputtering, vapor deposition, electrolytic deposition, and chemical deposition. Alternatively, the negative electrode 20 and the positive electrode 30 can also be formed by applying an electrode paste and then baking it, or by thermal spraying. Furthermore, the negative electrode 20 and the positive electrode 30 may be formed by joining metal sheets or alloy sheets.

Each of the thicknesses of the negative electrode portion A1 of the negative electrode 20 and the positive electrode portion A2 of the positive electrode 30 is about 5 to 80 μm for baking the electrode paste, and about 100 to 1000 nm for dry plating such as sputtering and vapor deposition, and about 10 to 100 μm for thermal spraying, and about 5 μm to 30 μm for wet plating such as electrolytic deposition and chemical deposition, although not particularly limited thereto. Further, when joining the metal sheet or alloy sheet, each of the thicknesses is preferably about 5 to 100 μm.

Although each of the thicknesses of the negative electrode portion B1 of the negative electrode 20 and the positive electrode portion B2 of the positive electrode 30 is not particularly limited, a higher thickness is desirable in terms of ensuring electrical continuity, but a lower thickness is advantageous in that ventilation resistance of inflow air can be reduced. Therefore, each of the thicknesses of the negative electrode portion B1 and the positive electrode B2 is preferably 1/10,000 to 1/10, more preferably 1/1,000 to 1/20, of a hydraulic diameter of the cell 13.

Here, the hydraulic diameter of the cell 13 as used herein is a value (P−t) determined by subtracting a thickness t (mm) of the partition wall 14 from the cell pitch P (mm) described above.

Each of the thicknesses of the negative electrode portion B1 of the negative electrode 20 and the positive electrode portion B2 of the positive electrode 30 is measured by the following procedure. First, a cross-sectional image of the heater element 100 at magnifications of about 50 is acquired using a scanning electron microscope or the like. The cross section is a cross section parallel to the flow path direction of the honeycomb structure 10 as illustrated in FIG. 1A. Also, this cross section is made to pass through the center of gravity in the cross section orthogonal to the flow path of the honeycomb structure 10. For each of the negative electrode portion B1 and the positive electrode portion B2 visually recognized from the cross-sectional image, the thickness is calculated by dividing a cross-sectional area by the length of the cells 13 in the extending direction of the flow path. This calculation is performed for all of the negative electrode portion B1 of the negative electrode 20 and the positive electrode portion B2 of the positive electrode 30, which are visually recognized from the cross-sectional image, and the overall average values are determined to be the thicknesses of the negative electrode portion B1 of the negative electrode 20 and the positive electrode portion B2 of the positive electrode 30.

In the heater element 100, the negative electrode portion B1 and the positive electrode portion B2 are continuously provided over a predetermined length on the entire surface of all the partition walls 14 that define the cells 13. In other words, when the heater element 100 is observed in a cross section orthogonal to the flow path direction in the region of the predetermined length, all the partition walls 14 defining the cells 13 (the partition walls 14 defining the outermost cells 13 and the outer peripheral wall 11) are covered over the whole circumference by the negative electrode portion B1 of the negative electrode 20 or the positive electrode portion B2 of the positive electrode 30 (FIG. 1B). Such a configuration allows the distance between the negative electrode 20 and the positive electrode 30 to be uniformly shortened in all the cells 13. This makes it easier for the heater element 100 to generate heat uniformly.

However, the negative electrode portion B1 of the negative electrode 20 or the positive electrode portion B2 of the positive electrode 30 may have a portion that does not cover the partition wall 14 when the heater element 100 is observed in the cross section orthogonal to the flow path direction in the region of the predetermined length. That is, the negative electrode portion B1 and the positive electrode portion B2 can be continuously provided over the predetermined length on the surfaces of some of the partition walls 14 that define the cells 13. Specifically, the negative electrode portion B1 and the positive electrode portion B2 may be continuously provided over the predetermined length on the surfaces of some of all the partition walls 14 that define the cells 13, or the negative electrode portion B1 and the positive electrode portion B2 may be continuously provided over a predetermined length on the surfaces of part of some partition walls 14 that define the cells 13 or on the entire surface.

Referring now to FIGS. 3A to 3D, they show schematic views of cross sections orthogonal to the flow path direction of heater elements according to several other embodiments where the negative electrode portions B1 of the negative electrodes 20 or the positive electrode portions B2 of the positive electrodes 30 have different structures. FIGS. 3A to 3D each corresponds to the cross section taken along the line a-a' in FIG. 1A, and they omit the functional material-containing layer 40 for ease of understanding.

Figure 3A:
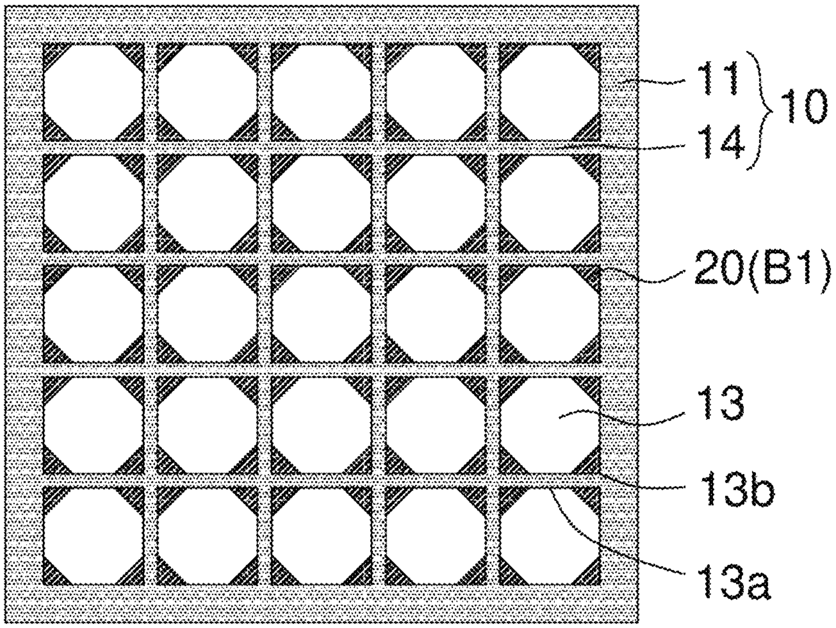
FIG. 3A is a schematic view of a cross section of a heater element according to another embodiment of the present invention, which is orthogonal to a flow path direction.

In the embodiment of FIG. 3A, all the cells 13 are provided with the negative electrode portion B1 and the positive electrode portion B2. Further, the partition wall 14 that defines each cell 13 (in the case of the outermost cell 13, the partition wall 14 that defines the outermost cells 13 and the outer peripheral wall 11) has a rectangular cross section, and all corner portions 13*b* are covered by the negative electrode portion B1 and the positive electrode portion B2. On the other hand, all of side portions 13*a* other than the corner portions 13*b* are not covered with the negative electrode portion B1 and the positive electrode portion B2.

Figure 3B:
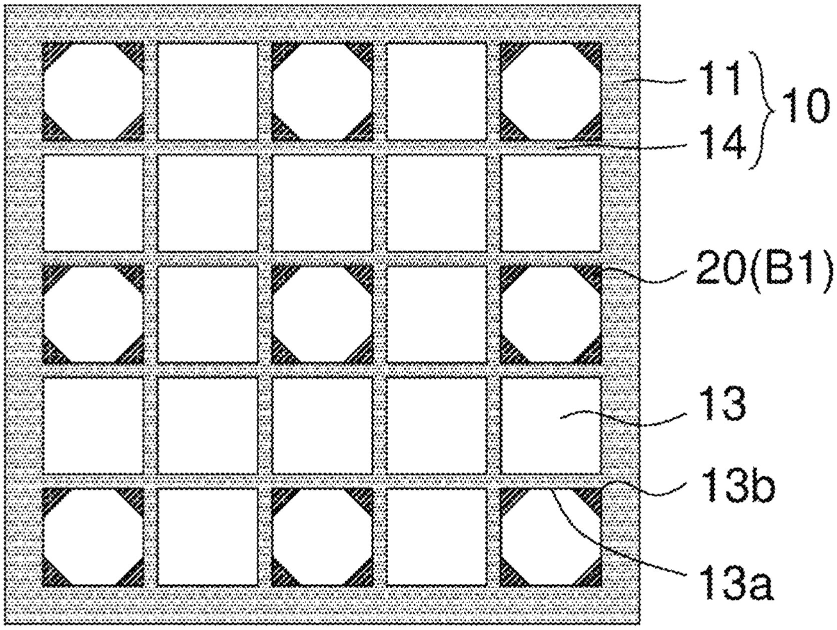
FIG. 3B is a schematic view of a cross section of a heater element according to another embodiment of the present invention, which is orthogonal to a flow path direction.

In the embodiment of FIG. 3B, some cells 13 are provided with the negative electrode portion B1 and the positive electrode portion B2. Further, the partition wall 14 that defines each cell 13 in which the negative electrode portion B1 and the positive electrode portion B2 are provided (in the case of the outermost cell 13 in which the negative electrode portion B1 and the positive electrode portion B2 are provided, the partition wall 14 that defines the outermost cell 13 and the outer peripheral wall 11) has a rectangular cross section, and all the corner portions 13*b* are covered with the negative electrode portion B1 and the positive electrode portion B2. On the other hand, none of the side portions 13*a* other than the corner portions 13*b* is covered with the negative electrode portion B1 and the positive electrode portion B2. In addition, when some cells 13 are provided with the negative electrode portion B1 and the positive electrode portion B2, it is preferable that in the cross section orthogonal to the flow path direction, the negative electrode portion B1 and the positive electrode portion B2 are provided point-symmetrically with the central axis as the center of symmetry, or the negative electrode portion B1 and the positive electrode portion B2 are provided line-symmetrically with any line segment passing through the central axis as the center of symmetry, in terms of heat generation uniformity.

Figure 3C:
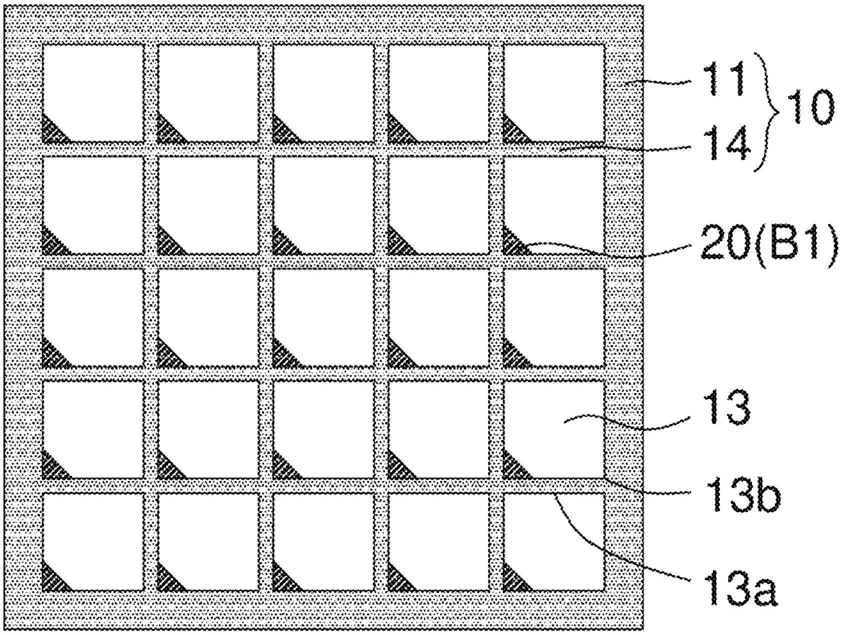
FIG. 3C is a schematic view of a cross section of a heater element according to another embodiment of the present invention, which is orthogonal to a flow path direction.

In the embodiment of FIG. 3C, all the cells 13 are provided with the negative electrode portion B1 and the positive electrode portion B2. Further, the partition wall 14 that defines each cell 13 (in the case of the outermost cell 13, the partition wall 14 that defines the outermost cell 13 and the outer peripheral wall 11) has a rectangular cross section, and only one corner portion 13*b* is covered with the negative electrode portion B1 and the positive electrode portion B2. On the other hand, all portions other than one corner portion 13*b* are not covered with the negative electrode portion B1 and the positive electrode portion B2.

Figure 3D:
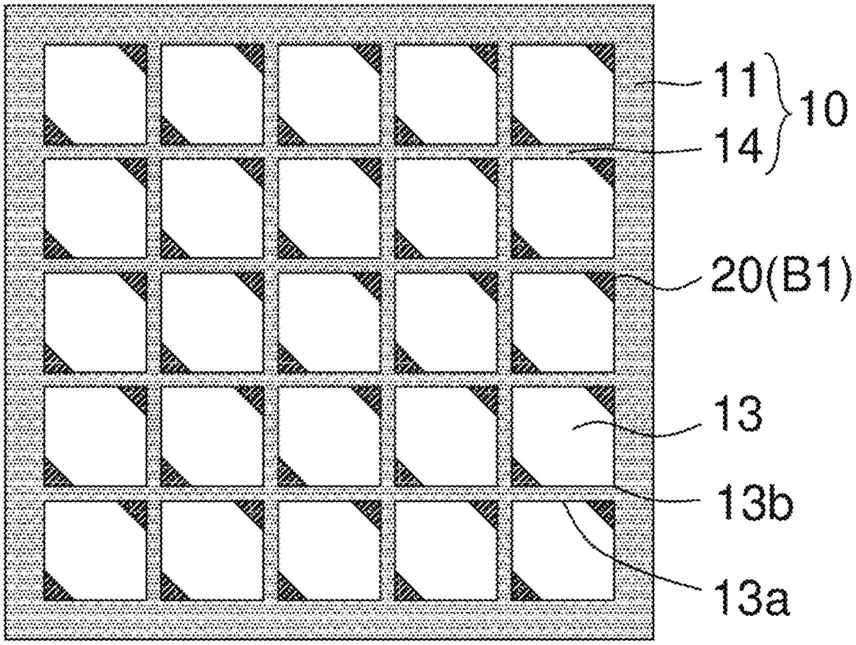
FIG. 3D is a schematic view of a cross section of a heater element according to another embodiment of the present invention, which is orthogonal to a flow path direction.

In the embodiment of FIG. 3D, all the cells 13 are provided with the negative electrode portion B1 and the positive electrode portion B2. Also, the partition wall 14 that defines each cell 13 (in the case of the outermost cell 13, the partition wall 14 that defines the outermost cell 13 and the outer peripheral wall 11) has a quadrangular cross section, and only a pair of opposing corner portions 13*b* are covered with the negative electrode portion B1 and the positive electrode portion B2. On the other hand, all portions other than the pair of opposing corner portions 13*b* are not covered with the negative electrode portion B1 and the positive electrode portion B2.

(1-3. Functional Material-Containing Layer)

The functional material-containing layer 40 is provided on the surfaces of the partition walls 14 (in the case of the outermost cells 13, the partition walls 14 that define the outermost cells 13 and the outer peripheral wall 11) on which the negative electrode portion B1 and the positive electrode portion B2 are not provided, as well as on the surfaces of the negative electrode portion B1 and the positive electrode portion B2. By thus providing the functional material-containing layer 40, the functional material in the functional material-containing layer 40 can be easily heated, so that the functional material can exert its desired functions.

The functional material-containing layer 40 contains at least a dehumidifying material. Therefore, the functional material-containing layer 40 can repeatedly trap and release the moisture in the air. Therefore, the heater element 100 can be used as a device having a dehumidifying function (dehumidifying device).

As used herein, the "dehumidifying material" refers to a substance having properties in which a mass (g) of water that can be adsorbed per 1 g of its own dry mass is 0.1 g/g or more when it is left for one hour in an environment at room temperature (25° C.) and at a relative humidity of 50%, and the substance is also called a moisture absorbent. The dehumidifying material preferably adsorbs the moisture at a temperature of −20° C. to less than 30° C. The dehumidifying material has a function of adsorbing the moisture at temperatures of −20° C. to less than 30° C. and releasing it at a temperature more than or equal to 30° C. (for example, 30 to 100° C.), so that the functions of the dehumidifying material can repeatedly be obtained by repeating the electric conduction and non-electric conduction.

Non-limiting examples of the dehumidifying material include aluminosilicates, silica gels, silica, graphene oxides, polymer adsorbents, polystyrene sulfonic acid, and metal organic frameworks (MOFs). These may be used alone or in combination of two or more.

Examples of the aluminosilicate that can be used herein include AFI type-, CHA type- or BEA type-zeolite; and porous clay minerals such as allophane and imogolite. It is also preferable that the aluminosilicate is amorphous.

Examples of the silica gel that can be used herein include A-type silica gel.

Examples of the polymer adsorbent include preferably those having a polyacrylic acid polymer chain. For example, sodium polyacrylate or the like can be used as the polymer adsorbent.

The metal organic framework is a crystalline hybrid material containing metal ions and organic molecules (organic ligands). The metal ion is preferably a hydrophilic metal ion (for example, an aluminum ion).

The thickness of the functional material-containing layer 40 may be determined according to the size of the cells 13, and is not particularly limited. For example, the thickness of the functional material-containing layer 40 is preferably 20 μm or more, and more preferably 25 μm or more, and even more preferably 30 μm or more, from the viewpoint of ensuring sufficient contact with air. On the other hand, the thickness of the functional material-containing layer 40 is preferably 400 μm or less, and more preferably 380 μm or less, and even more preferably 350 μm or less, from the viewpoint of suppressing separation of the functional material-containing layer 20 from the partition walls 14 and the outer peripheral wall 11.

The thickness of the functional material-containing layer 40 is measured using the following procedure. Any cross section parallel to the flow path direction of the honeycomb structure 10, as illustrated in FIG. 1A, is cut out, and a cross-sectional image at magnifications of about 50 is acquired using a scanning electron microscope or the like. Also, this cross section is made to pass through the center of gravity in the cross section orthogonal to the flow path of the honeycomb structure 10. The thickness of each functional material-containing layer 40 visually recognized from the cross-sectional image is calculated by dividing the cross-sectional area by the length of the cells 13 in the flow path direction. This calculation is performed for all the functional material-containing layers 40 visually recognized from the cross-sectional image, and an average value thereof is determined to be the thickness of the functional material-containing layer 40.

From the viewpoint that the functional material exhibits a desired function in the heater element 100, an amount of the functional material-containing layer 40 is preferably 50 to 500 g/L, and more preferably 100 to 400 g/L, and even more preferably 150 to 350 g/L, based on the volume of the honeycomb structure 10. It should be noted that the volume of the honeycomb structure 10 is a value determined by the external dimensions of the honeycomb structure 10.

Figure 4:
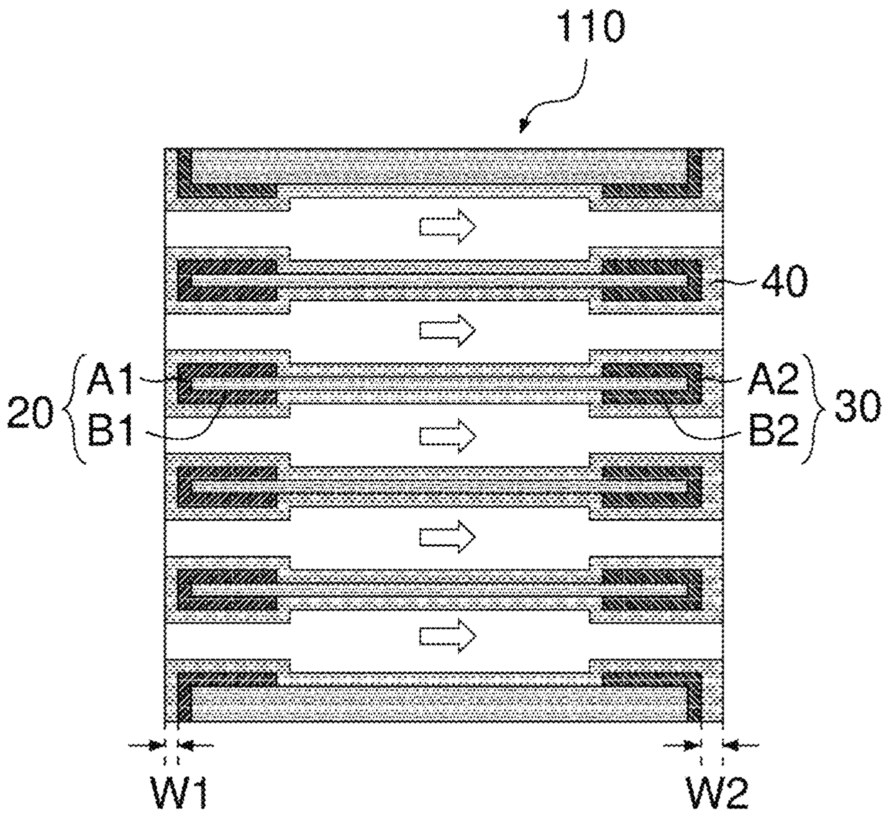
FIG. 4 is a schematic view of a cross section of a heater element according to another embodiment of the present invention, which is parallel to an extending direction of cells (flow path)

The functional material-containing layer 40 can also be provided on surfaces of at least part of the negative electrode portion A1 and the positive electrode portion A2. FIG. 4 shows a schematic cross-sectional view of a heater element having such an embodiment, which is parallel to an extending direction of cells (flow path).

As shown in FIG. 4, a heater element 110 has a functional material-containing layer 40 on surfaces of partition walls 14 where a negative electrode portion B1 and a positive electrode portion B2 are not provided, and on surfaces of the negative electrode portion B1 and the positive electrode portion B2, as well as on surfaces of a negative electrode portion A1 and a positive electrode portion A2. Although FIG. 4 shows an example in which the functional material-containing layer 40 is provided on all surfaces of the negative electrode portion A1 and the positive electrode portion A2, the functional material-containing layer 40 may be provided on surfaces of part of the negative electrode portion A1 and the positive electrode portion A2. By thus providing the functional material-containing layer 40, it is possible to increase an amount of the functional material supported, so that the desired function of the functional material can be improved.

The thickness of the functional material-containing layer 40 provided on the surfaces of the negative electrode portion A1 and the positive electrode portion A2 is not particularly limited, and the thickness can be the same as that of the functional material-containing layer 40 provided on the surfaces of the partition walls 14 where the negative electrode portion B1 and the positive electrode portion B2 are not provided and on the surfaces of the negative electrode portion B1 and the positive electrode portion B2. However, the functional material-containing layer 40 provided on the surface of the positive electrode portion A2 on the downstream side is more easily heated than the functional material-containing layer 40 provided on the surface of the negative electrode portion A1 on the upstream side. Therefore, a thickness W2 of the functional material-containing layer 40 provided on the surface of the positive electrode portion A2 is preferably larger than a thickness W1 of the functional material-containing layer 40 provided on the surface of the negative electrode portion A1. Such a configuration allows the amount of the functional material supported to be increased, so that the desired function of the functional material can be improved.

It should be noted that the thickness of the functional material-containing layer 40 provided on the surfaces of the negative electrode portion A1 and the positive electrode portion A2 can be calculated by the same method as described above.

Since the negative electrode portion A1 on the upstream side is difficult to be heated, the thickness of the functional material-containing layer 40 provided on the surface of the negative electrode portion A1 is preferably smaller. Specifically, the thickness of the functional material-containing layer 40 provided on the surface of the negative electrode portion A1 is preferably 300 μm or less, and more preferably 250 μm or less, and still more preferably 200 μm or less. Such a configuration allows the adhesion and retention of the moisture in the functional material-containing layer 40 on the upstream side to be reduced, so that the deterioration of the negative electrode 20 can be suppressed.

In addition to the dehumidifying material, the functional material-containing layer 40 can further contain a functional material capable of adsorbing one or more selected from carbon dioxide and volatile components. With such a configuration, it can be used as device (air conditioning device) that has the function of removing not only the moisture but also carbon dioxide and/or volatile components from the air.

The functional material-containing layer 40 can contain various adsorbents and catalysts that have the function of adsorbing harmful volatile components other than the functional materials as described above. The use of the catalyst can purify the components to be removed. Furthermore, the adsorbent and the catalyst may be used together for the purpose of enhancing the ability of the adsorbent to trap the component to be removed, and the like.

The adsorbent preferably has a function that can adsorb the components to be removed, such as carbon dioxide and volatile components, at −20 to 40° C. and release them at an elevated temperature of 60° C. or more. Examples of the adsorbent having such functions include zeolite, silica gel, activated carbon, alumina, silica, low-crystalline clays, amorphous aluminum silicate complexes, and the like. These exemplified substances may also function as the dehumidifying material as described above. The type of the adsorbent may be appropriately selected depending on the types of the components to be removed. The adsorbent may be used alone, or in combination with two or more types.

The catalyst preferably has a function capable of promoting the oxidation-reduction reaction. The catalysts having such functions include metal catalysts such as Pt, Pd and Ag, and oxide catalysts such as $CeO_2$ and $ZrO_2$. The catalyst may be used alone, or in combination with two or more types.

The functional material-containing layer 40 may further contain a binder. By containing the binder, the function of holding the functional material-containing layer 40 to the surfaces of the partition walls 14 can be enhanced. Although the binder includes both organic binders and inorganic binders, the inorganic binders are preferred. The type of inorganic binder is not particularly limited, but examples of the inorganic binder include alumina sol, silica sol, montmorillonite, boehmite, gamma alumina, and attapulgite. These may be used alone or in combination of two or more. Among these, the alumina sol and the silica sol are preferred, and silica sol is more preferred, because adhesive strength can be easily ensured.

The functional material-containing layer 40 may further contain an antimicrobial material. By containing the antimicrobial material, it is possible to suppress the functional depression of the functional material-containing layer 40 due to the growth of mold and the like, and the deterioration of the environment inside the vehicle interior due to the scattering of mold into the vehicle interior. The type of antimicrobial material is not particularly limited as long as it has an antimicrobial effect and does not inhibit the function of the dehumidifying material, but examples of the antimicrobial material include visible light-responsive photocatalysts such as titanium oxide; silver; copper; and zinc. These may be used alone or in combination of two or more. Moreover, among them, titanium oxide is preferable, and porous titanium oxide is more preferable.

The volatile components contained in the air in the vehicle interior include, for example, volatile organic compounds (VOCs), and odor components other than the VOCs Specific examples of the volatile components include ammonia, acetic acid, isovaleric acid, nonenal, formaldehyde, toluene, xylene, paradichlorobenzene, ethylbenzene, styrene, chlorpyrifos, di-n-butyl phthalate, tetradecane, and di-2-ethylhexyl phthalate, diazinon, acetaldehyde, 2-(1-methylpropyl)phenyl N-methylcarbamate, and the like.

Figure 5:
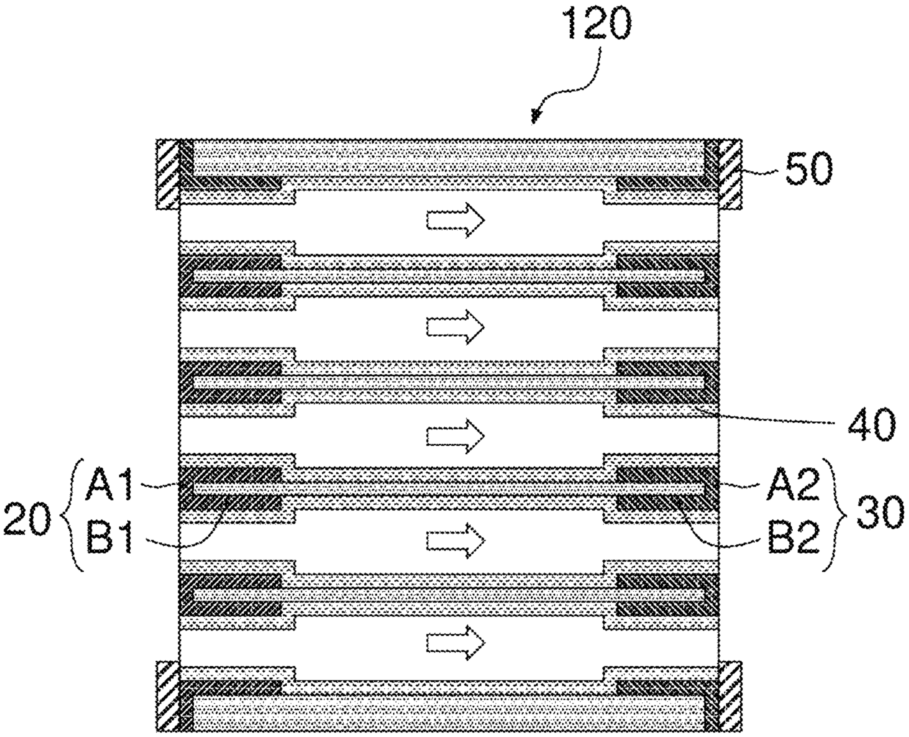
FIG. 5 is a schematic view of a cross section of a heater element according to another embodiment of the present invention, which is parallel to an extending direction of cells (flow path)

Each of the heater elements 100, 110, 120 according to the embodiments of the present invention may further include terminals provided on the surfaces of at least part of the negative electrode portion A1 and the positive electrode portion A2, if necessary. Here, FIG. 5 shows a schematic view of a cross section of the heater element 100, 110, 120 including the terminals, which is parallel to the extending direction of the cells 13 (flow path). It should be noted that although the heater element 120 in FIG. 5 shows an example in which terminals 50 are further provided on the surfaces of at least part of the negative electrode portion A1 and the positive electrode portion A2 of the heater element 100, the terminals 50 may be provided on the surfaces of at least part of the negative electrode portion A1 and the positive electrode portion A2 of the heater element 110. In this case, the functional material-containing layer 40 is not provided on the surfaces of at least part of the negative electrode portion A1 and the positive electrode portion A2 on which the terminals 50 are provided, so that the terminals 50 and the negative electrode portion A1 and the positive electrode portion A2 should be in direct contact with each other.

(1-4. Terminal)

The terminals 50 are provided on the surfaces of at least part of the negative electrode portion A1 and the positive electrode portion A2. The provision of the terminals 50 facilitates connection to an external power supply. The terminals 50 are connected to a conductor connected to the external power supply.

The terminals 50 may be made of, for example, a metal, although not particularly limited thereto. Examples of the metal that can be used herein include single metals, alloys, and the like, but from the viewpoint of corrosion resistance, electrical resistivity, and coefficient of linear expansion, the metal can be, for example, a material (metal or alloy) containing one or more selected from aluminum, stainless steel, nickel, silver, and copper.

The size and shape of each terminal 50 are not particularly limited. For example, as shown in FIG. 5, the terminals 50 can be provided on the whole of the negative electrode portion A1 and the positive electrode portion A2 on the outer peripheral wall 11.

Further, the terminals 50 may be provided on part of the negative electrode portion A1 and the positive electrode portion A2 on the outer peripheral wall 11, or may be provided so as to extend outwardly of the outer edges and/or inwardly of the inner edges of the negative electrode portion A1 and the positive electrode portion A2 on the outer peripheral wall 11. Further, the terminals 50 may be provided on part of the negative electrode portion A1 and the positive electrode portion A2 on the partition walls 14, or may be provided so as to close some cells 13.

The method of connecting the terminals 50 to the negative electrode portion A1 and the positive electrode portion A2 is not particularly limited as long as they are electrically connected, and for example, the connection may be made by diffusion bonding, a mechanical pressure mechanism, welding, or the like.

(2. Method for Producing Heater Element)

The method for producing the heater element 100, 110, 120 according to the embodiment of the present invention is not particularly limited as long as it is the method having the above features, and it can be performed according to a known method. Hereinafter, the method for producing the heater element 100, 110, 120 according to an embodiment of the present invention will be illustratively described.

A method for producing the honeycomb structure 10 forming the heater element 100 includes a forming step and a firing step.

In the forming step, a green body containing a ceramic raw material including $BaCO_3$ powder, $TiO_2$ powder, and rare earth nitrate or hydroxide powder is formed to prepare a honeycomb formed body having a relative density of 60% or more.

The ceramic raw material can be obtained by dry-mixing the powders so as to have a desired composition.

The green body can be obtained by adding a dispersion medium, a binder, a plasticizer and a dispersant to the ceramic raw material and kneading them. The green body may optionally contain additives such as shifters, metal oxides, property improving agents, and conductor powder.

The blending amount of the components other than the ceramic raw material is not particularly limited as long as the relative density of the honeycomb formed body is 60% or more.

As used herein, the "relative density of the honeycomb formed body" means a ratio of the density of the honeycomb formed body to the true density of the entire ceramic raw material. More particularly, the relative density can be determined by the following equation:

relative density of honeycomb formed body (%)=density of honeycomb formed body (g/cm$^3$)/true density of entire ceramic raw material (g/cm$^3$)×100.

The density of the honeycomb formed body can be measured by the Archimedes method using pure water as a medium. Further, the true density of the entire ceramic raw material can be obtained by dividing the total mass of the respective raw materials (g) by the total volume of the actual volumes of the respective raw materials (cm$^3$).

Examples of the dispersion medium include water or a mixed solvent of water and an organic solvent such as alcohol, and more preferably water.

Examples of the binder include organic binders such as methyl cellulose, hydroxypropoxyl cellulose, hydroxyethyl cellulose, carboxymethyl cellulose, and polyvinyl alcohol. In particular, it is preferable to use methyl cellulose in combination with hydroxypropoxyl cellulose. The binder may be used alone, or in combination of two or more, but it is preferable that the binder does not contain an alkali metal element.

Examples of the plasticizer include polyoxyalkylene alkyl ethers, polycarboxylic acid-based polymers, and alkyl phosphate esters.

The dispersant that can be used herein includes surfactants such as polyoxyalkylene alkyl ether, ethylene glycol, dextrin, fatty acid soaps, and polyalcohol. The dispersant may be used alone or in combination of two or more.

The honeycomb formed body can be produced by extrude the green body. In the extrusion, a die having a desired overall shape, cell shape, partition wall thickness, cell density and the like can be used.

The relative density of the honeycomb formed body obtained by extrusion is 60% or more, and preferably 65% or more. By controlling the relative density of the honeycomb formed body to such a range, the honeycomb formed body can be densified and the electrical resistance at room temperature can be reduced. The upper limit of the relative density of the honeycomb formed body is not particularly limited, but it may generally be 80%, and preferably 75%.

The honeycomb formed body can be dried before the firing step. Non-limiting examples of the drying method include conventionally known drying methods such as hot air drying, microwave drying, dielectric drying, drying under reduced pressure, drying in vacuum, and freeze drying. Among these, a drying method that combines the hot air drying with the microwave drying or dielectric drying is preferable in that the entire formed body can be rapidly and uniformly dried.

The firing step includes maintaining the formed body at a temperature of from 1150 to 1250° C., and then increasing the temperature to a maximum temperature of from 1360 to 1430° C. at a heating rate of 20 to 600° C./hour, and maintaining the temperature for 0.5 to 10 hours.

The maintaining of the honeycomb formed body at the maximum temperature of from 1360 to 1430° C. for 0.5 to 10 hours can provide the honeycomb structure 10 containing, as a main component, $BaTiO_3$-based crystal particles in which a part of Ba is substituted with the rare earth element.

Further, the maintaining at the temperature of from 1150 to 1250° C. can allow the $Ba_2TiO_4$ crystal particles generated in the firing process to be easily removed, so that the honeycomb structure 10 can be densified.

Further, the heating rate of 20 to 600° C./hour from the temperature of 1150 to 1250° C. to the maximum temperature of 1360 to 1430° ° C. can allow 1.0 to 10.0% by mass of $Ba_6Ti_{17}O_{40}$ crystal particles to be formed in the honeycomb structure 10.

The maintaining time at 1150 to 1250° C. is not particularly limited, but it may preferably be from 0.5 to 10 hours. Such a maintaining time can lead to stable and easy removal of $Ba_2TiO_4$ crystal particles generated in the firing process.

The firing step preferably includes maintaining at 900 to 950° C. for 0.5 to 5 hours during the increasing of the temperature. The maintaining at 900 to 950° C. for 0.5 to 5 hours can lead to sufficient decomposition of $BaCO_3$, so that the honeycomb structure 10 having a predetermined composition can be easily obtained.

Prior to the firing step, a degreasing step for removing the binder may be performed. The degreasing step may preferably be performed in an air atmosphere in order to decompose the organic components completely.

Also, the atmosphere of the firing step may preferably be the air atmosphere in terms of control of electrical characteristics and production cost.

A firing furnace used in the firing step and the degreasing step is not particularly limited, but it may be an electric furnace, a gas furnace, or the like.

By forming a pair of electrodes (the negative electrode 20 and the positive electrode 30) on the honeycomb structure 10 thus obtained and then forming the functional material-containing layer 40 at the predetermined position, the heater element 100, 110, 120 can be produced. The pair of electrodes can also be formed by metal deposition methods such as sputtering, vapor deposition, electrolytic deposition, and chemical deposition. Further, the pair of electrodes can be formed by applying an electrode paste and then baking it. Furthermore, the pair of electrodes can also be formed by thermal spraying. The pair of electrodes may be composed of a single layer, but may also be composed of a plurality of electrode layers having different compositions. A typical method for forming the pair of electrodes will be described below.

First, an electrode slurry containing an electrode material, an organic binder, and a dispersion medium is prepared, and the honeycomb structure 10 is immersed in the slurry from the inlet end face 12*a* or the outlet end face 12*b* to a desired depth in the flow path direction of the honeycomb structure 10. The dispersion medium can be water, an organic solvent (e.g., toluene, xylene, ethanol, n-butanol, ethyl acetate, butyl acetate, terpineol, dihydroterpineol, texanol, ethylene glycol monobutyl ether acetate, diethylene glycol monoethyl ether acetate, diethylene glycol monoethyl ether, diethylene glycol monobutyl ether acetate, diethylene glycol monobutyl ether) or a mixture thereof. An excess slurry on the periphery of the honeycomb structure 10 is removed by blowing and wiping. The slurry can be then dried to form the negative electrode portion B1 and the positive electrode portion B2 on the surfaces of the partition walls 14 and the like, and form the negative electrode portion A1 and the positive electrode portion A2 on the inlet end face 12*a* or the outlet end face 12*b* of the honeycomb structure 10. The negative electrode portion A1 and the positive electrode portion A2 may be separately formed by the method as described above. The drying can be performed while heating the heater element 100 to a temperature of about 120 to 600° C., for example. Although a series of steps of immersion, slurry removal, and drying may be performed only once, the steps can be repeated multiple times to provide the negative electrode portion A1 and the positive electrode portion A2 and the negative electrode portion B1 and the positive electrode portion B2 having desired thicknesses.

The surface tension varies depending on the viscosity of the slurry, whereby the covering state of the side portions 13*a* and the corner portions 13*b* of the partition walls 14 defining the cells 13 (the partition walls 14 that define the outermost cells 13 and the outer peripheral wall 11) by the negative electrode portion B1 and the positive electrode portion B2 can be changed. For example, when the entire surface of the partition walls 14 is covered as shown in FIG. 1B, the viscosity of the electrode slurry may be relatively low. As shown in FIGS. 3A to 3D, when only the corner portions 13*b* of the partition walls 14 are covered, the viscosity of the electrode slurry may be relatively high. The difference among FIGS. 3A to 3D can be achieved by, for example, masking the inlet end face 12*a* or the outlet end face 12*b* of the honeycomb structure 10 when the honeycomb structure 10 is immersed in the electrode slurry. Examples of the masking method include a method of attaching a resin sheet to the inlet end face 12*a* or the outlet end face 12*b* of the honeycomb structure 10, and forming holes in the resin sheet at locations corresponding to the cells 13 where the negative electrode portion B1 and the positive electrode portion B2 are to be formed, by means of a laser.

It should be noted that when the terminals 50 are provided at predetermined positions of the negative electrode portion A1 and the positive electrode portion A2, the terminals 50 may be placed at predetermined positions of the negative electrode portion A1 and the positive electrode portion A2 and connected to each other. The above method can be used to connect the negative electrode portion A1 and the positive electrode portion A2 to the terminals 50. Furthermore, the terminals 50 may be provided after forming the functional material-containing layer 40.

Although the method for forming the functional material-containing layer 40 is not particularly limited, it can be formed, for example, by the following steps. The heater element 100 is immersed in a slurry containing a functional material, an organic binder, and a dispersion medium for a predetermined period of time, and an excess slurry on the end faces and the outer periphery of the honeycomb structure 10 is removed by blowing and wiping. The dispersion medium can be water, an organic solvent (e.g., toluene, xylene, ethanol, n-butanol, ethyl acetate, butyl acetate, terpineol, dihydroterpineol, texanol, ethylene glycol monobutyl ether acetate, diethylene glycol monoethyl ether acetate, diethylene glycol monoethyl ether, diethylene glycol monobutyl ether acetate, diethylene glycol monobutyl ether) or a mixture thereof. The slurry can be then dried to form the functional material-containing layer 40 on the surfaces of the partition walls 14 and the like. The drying can be performed while heating the heater element 100 to a temperature of about 120 to 600° C., for example. Although a series of steps of immersion, slurry removal, and drying may be performed only once, the steps can be repeated multiple times to provide the functional material-containing layer 40 having the desired thickness on the surfaces of the partition walls 14 and the like.

(3. Vehicle Air Conditioning System)

According to an embodiment of the present invention, a vehicle air conditioning system including the heater element 100, 110, 120 as described above is provided. The vehicle air conditioning system can be suitably used for various vehicles such as automobiles.

Figure 6:
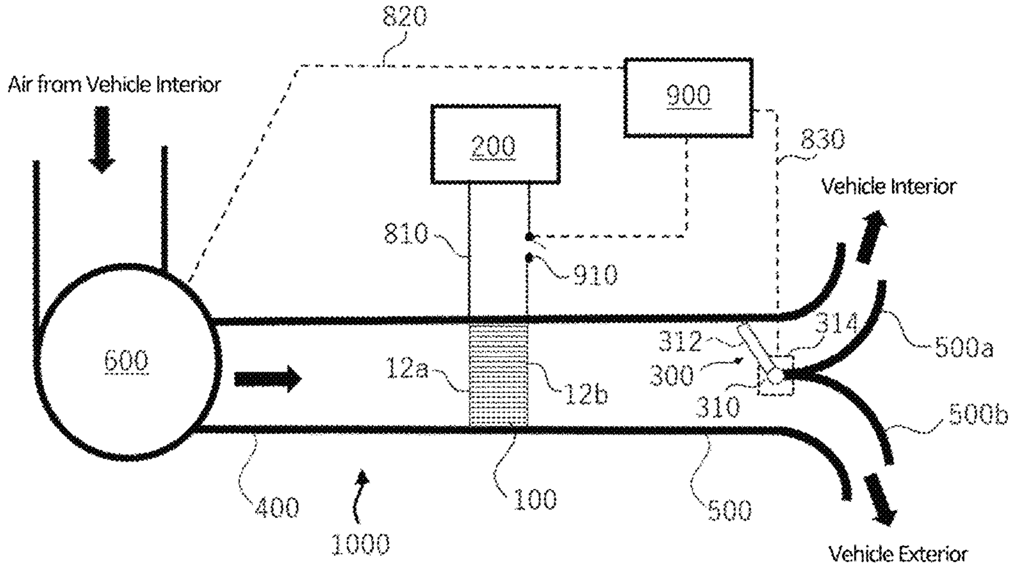
FIG. 6 is a schematic view illustrating a structure of a vehicle air conditioning system according to an embodiment of the present invention.

FIG. 6 is a schematic view illustrating a structure of a vehicle air conditioning system according to an embodiment of the present invention.

As shown in FIG. 6, a vehicle air conditioning system 1000 includes: at least one heater element 100; a power supply 200 such as a battery for applying voltage to the heater element 100; an inflow pipe 400 for communicating the vehicle interior with the inlet end face 12*a* of the heater element 100; an outflow pipe 500 for communicating the outlet end face 12*b* with the vehicle interior or a vehicle exterior; and a switching valve 300 provided in the outflow pipe 500, the switching valve 300 being capable of switching a flow of an air flowing through the outflow pipe 500 to the vehicle interior or the vehicle exterior. It should be noted that although FIG. 6 illustrates the case where the heater element 100 is used, the heater element 110, 120 may be used in place of the heater element 100.

The outflow pipe 500 can have a first path 500*a* for communicating the outlet end face 12*b* of the heater element 100 with the vehicle interior and a second path 500*b* for communicating the outlet end face 12*b* with the vehicle exterior. The switching valve 300 can switch the flow of the air flowing through the outflow pipe 500 between the first path 500*a* and the second path 500*b*.

The vehicle air conditioning system 1000 can further include a ventilator 600 for causing air from the vehicle interior to flow into the inlet end face 12*a* of the heater element 100 via the inflow pipe 400

The vehicle air conditioning system 1000 can have operation modes: a first mode where the voltage applied from the power supply 200 is turned off, the switching valve 300 is switched such that the air flowing through the outflow pipe 500 passes through the first path 500*a* (such that the air flows into the vehicle interior), and the ventilator 600 is turned on; and a second mode where the voltage applied from the power supply 200 is turned on, the switching valve 300 is switched such that the air flowing through the outflow pipe 500 passes through the second path 500*b* (the air flows to the vehicle exterior), and the ventilator 600 is turned on.

The vehicle air conditioning system 1000 can include a control unit 900 that can execute the switching between the first mode and the second mode. For example, the control unit 900 may be configured to be able to alternately execute the first mode and the second mode. By repeating the switching between the first mode and the second mode in a constant cycle, the components to be removed can be stably discharged from the vehicle interior to the outside of the vehicle.

In the first mode, the adjustment (humidification and/or purification) of the air in the vehicle interior is carried out. Specifically, the air from the vehicle interior flows in from the inlet end face 12*a* of the heater element 100 through the inflow pipe 400, passes through the interior of the heater element 100, and then flows out from the outlet end face 12*b* of the heater element 100. The components to be removed from the air from the vehicle interior are removed such as by capturing them by the functional material while passing through the heater element 100. The adjusted air flowing out from the outlet end face 12*b* of the heater element 100 is returned to the vehicle interior through the first path 500*a* of the outflow pipe 500.

In the second mode, the functional material is regenerated. Specifically, the air from the vehicle interior flows in from the inlet end face 12*a* of the heater element 100 through the inflow pipe 400, passes through the interior of the heater element 100, and then flows out from the outlet end face 12*b* of the heater element 100. The heater element 100 generates the heat by electric conduction, whereby the functional material supported by the heater element 100 is heated. Therefore, the components to be removed that are captured by the functional material are released from or allowed to react with the functional material.

In order to promote the releasing of the components to be removed that have been trapped by the functional material, it is preferable to heat the functional material to a release temperature or higher depending on the type of the functional material. For example, when the adsorbent such as the humidifying material is used as the functional material, at least a part (preferably the whole) of the functional material is preferably heated to 70 to 150° C., and more preferably 80 to 140° C., and even more preferably 90 to 130° C. Further, it is desirable that the second mode is carried out for a period of time until the functional material is sufficiently regenerated. For example, when the adsorbent such as the humidifying material is used as the functional material, in the second mode, the functional material is preferably heated in the above temperature range for 1 to 10 minutes, and more preferably heated for 2 to 8 minutes, and even more preferably heated for 3 to 6 minutes, although it depends on the type of the functional material.

The air from the vehicle interior flows out from the outlet end face 12*b* of the heater element 100 while accompanying the components to be removed that have released from the functional material during passing through the heater element 100. The air containing the components to be removed that have flowed out from the outlet end face 12*b* of the heater element 100 is discharged to the outside of the vehicle through the second path 500*b* of the outflow pipe 500.

The switching between turning-on and turning-off of the voltage applied to the heater element 100 can be achieved, for example, by electrically connecting the power supply 200 to the negative electrode 20 and the positive electrode 30 of the heater element 100 with electric wires 810, and operating a power switch 910 provided in the middle of the electric wire 810. For the operation of the power switch 910, the control unit 900 can be operated.

The switching between turning-on and turning-off of the ventilator 600 can be achieved, for example, by electrically connecting the control unit 900 to the ventilator 600 with an electric wire 820 or wirelessly, and operating a power switch (not shown) by the control unit 900. The ventilator 600 can also be configured such that an amount of ventilation can be changed by the control unit 900.

The switching valve 300 can be switched, for example, by electrically connecting the control unit 900 to the switching valve 300 with an electric wire 830 or wirelessly, and operating a switch (not shown) of the switching valve 300 by the control unit 900.

The switching valve 300 is not particularly limited as long as it is electrically driven and has a function of switching the flow path, but examples thereof include an electromagnetic valve and a motor-operated valve. In one embodiment, the switching valve 300 includes an opening/closing door 312 supported by a rotating shaft 310 and an actuator 314 such as a motor that rotates the rotating shaft 310. The actuator 314 is configured to be controllable by the control unit 900.

In the vehicle air conditioning system 1000, the heater element 100 is preferably arranged at a position close to the vehicle interior, in terms of stably ensuring the above functions. Therefore, from the viewpoint of preventing electric shock, the drive voltage is preferably 60 V or less. Since the honeycomb structure 10 used in the heater element 100 has lower electrical resistance at room temperature, the honeycomb structure 10 can be heated at the lower drive voltage. The lower limit of the drive voltage is not particularly limited, but it may preferably be 10 V or more. If the drive voltage is less than 10 V, the current during heating of the honeycomb structure 10 is increased, so that the electric wire 810 should be thickened.

In the embodiment shown in FIG. 6, the ventilation 600 is installed on an upstream side of the heater element 100. More particularly, the ventilator 600 is installed in the middle of the inflow pipe 400 that communicates the heater element 100 with the vehicle interior, and the air that has passed through the ventilator 600 flows in so as to be pressed into the heater element 100. Alternatively, the ventilator 600 may be installed on a downstream side of the heater element 100. In this case, the ventilator 600 may be installed, for example, in the middle of the outflow pipe 500, and the air that has passed through the inflow pipe 400 flows in so as to be sucked into the heater element 100.

EXAMPLES

Hereinafter, the present invention will be described in more detail with reference to Examples, but the present invention is not limited to these Examples in any way.

Examples 1 to 15

As ceramic raw materials, $BaCO_3$ powder, $TiO_2$ powder and $La(NO_3)_3 \cdot 6H_2O$ powder were prepared. These powders were weighed so as to have the predetermined composition after firing, and dry-mixed to obtain a mixed powder. The dry mixing was carried out for 30 minutes. Subsequently, 3 to 30 parts by weight of water, a binder, a plasticizer and a dispersant in total were added by a proper amount, based on 100 parts by mass of the obtained mixed powder, such that aceramic formed body having a relative density of 64.8% were obtained after extrusion, and then kneaded to obtain a green body. Methyl cellulose was used as the binder. Polyoxyalkylene alkyl ether was used as the plasticizer and the dispersant.

The obtained green body was then introduced into an extrusion molding machine and extruded using a predetermined die to obtain a honeycomb structure having the shape as shown below after the firing.

- Shape of the cross section and each end face of the honeycomb structure orthogonal to the flow path direction: quadrangular;
- Shape of the cross section of each cell orthogonal to the flow path direction: quadrangular;
- Thickness of the partition wall: shown in Table 1;
- Thickness of the outer peripheral wall: 0.3 mm;
- Cell density: 80 cells/$cm^2$;
- Cell pitch: 1.1 mm;
- Cross-sectional area of the honeycomb formed body orthogonal to the extending direction of the flow path direction: 6000 $mm^2$;
- Length of the honeycomb formed body in the extending direction of the flow path: 10 mm;
- Volume resistivity at 25° C. of the material forming the outer peripheral wall and the partition walls: 15 Ω·cm; and
- Curie point of the material forming the outer peripheral wall and the partition walls: 110° C.

Subsequently, after dielectric drying and hot air drying of the obtained honeycomb formed body, it was degreased in an air atmosphere in a firing furnace (at 450° C. for 4 hours), and then fired in an air atmosphere to obtain a honeycomb structure. The firing was carried out by maintaining it at 950° C. for 1 hour, and then increasing the temperature to 1200° C. and maintaining it at 1200° C. for 1 hour, and then increasing the temperature at a temperature increasing rate of 200° C./hour to 1400° C. (the maximum temperature) and maintaining it at 1400° C. for 2 hours.

A pair of electrodes (negative electrode and positive electrode) each having the configuration as shown in FIG. 4 were then formed on both end faces (inlet end face and outlet end face) and at least some of the partition walls of the obtained honeycomb structure. The negative electrode was formed as follows. First, an electrode slurry containing aluminum (electrode material), ethyl cellulose, and diethylene glycol monobutyl ether (organic binder) was prepared, and the honeycomb structure was immersed in the electrode slurry from the inlet end face to a desired depth in the flow path direction of the honeycomb structure. Subsequently, after removing an excess electrode slurry on the outer periphery of the honeycomb structure by blowing and wiping, the electrode slurry was dried to form the negative electrode portions A1 and B1 on the inlet end face and the surfaces of the partition walls. Similarly, for the positive electrode, using the same electrode slurry, the honeycomb structure was immersed in the electrode slurry from the outlet end face to a desired depth in the flow path direction of the honeycomb structure, and an excess electrode slurry on the outer periphery of the honeycomb structure was removed and dried to form positive electrode portions A2 and B2 on the outlet end face and the surfaces of the partition walls.

The conditions for the negative electrode and the positive electrode were as follows:

- Flow path direction length $D_{B1}$ of the negative electrode portion B1: 0.2 mm;
- Flow path direction Length $D_{B2}$ of the positive electrode portion B2: 0.2 mm;
- Thickness of the negative electrode portion A1: 0.02 mm;
- Thickness of the negative electrode portion B1: 0.02 mm;
- Thickness of the positive electrode portion A2: 0.02 mm; and
- Thickness of the positive electrode portion B2: 0.02 mm.

It should be noted that the above lengths and thicknesses were measured as described above.

The honeycomb structure with the negative electrode and the positive electrode formed thereon was immersed in a slurry containing zeolite (moisture adsorbent), an organic binder, and water, and the slurry adhering to excess positions (such as the outer periphery) was removed by blowing and wiping, and the functional material-containing layer was then formed at a predetermined position by drying it at a temperature of about 550° C. Table 1 shows the thicknesses of the functional material-containing layer formed on the surfaces of the negative electrode portion A1 on the inlet end face, the positive electrode portion A2 on the outlet end face, and the negative electrode portion B1 and the positive electrode portion B2 on the partition walls. It should be noted that the functional material-containing layer is also formed on the surfaces of the partition walls where the negative electrode portion B1 and the positive electrode portion B2 are not provided, but its thickness is the same as that of the functional material-containing layer formed on the surfaces of the negative electrode portion B1 and the positive electrode portion B2. Further, the thickness of the functional material-containing layer formed in each portion was controlled by adjusting the number of times of a series of steps of immersion, slurry removal, and drying.

Comparative Example 1

Using the same honeycomb structure as that of Examples 1 to 13, the positive electrode was formed on the inlet end face of the honeycomb structure, and the negative electrode was formed on the outlet end face. The structures of the positive electrode and the negative electrode formed were the same as those of the above Examples.

The functional material-containing layer was formed only on the partition walls where a positive electrode portion (corresponding to the negative electrode portion B1 of the above Examples) and a negative electrode portion (corresponding to the positive electrode portion B2 of the above Examples) of the honeycomb structure in which the negative electrode and the positive electrode were formed, and on the surfaces of the positive electrode portion and the negative electrode portion.

Comparative Example 2

The same procedure as Example 1 was carried out, with the exception that the functional material-containing layer was formed on the positive electrode portion on the inlet end face (corresponding to the negative electrode portion A1 of the above Example) and the negative electrode portion on the outlet end face (corresponding to the positive electrode portion A2 of the above Examples), in addition to the partition walls where the positive electrode portion (corresponding to the negative electrode portion B1 of the above Examples) and the negative electrode portion (corresponding to the positive electrode portion B2 of the above Examples), and the positive electrode portion and the negative electrode portion, in the honeycomb structure in which the negative electrode and the positive electrode were formed.

The following evaluations were performed on the heater elements obtained by Examples and Comparative Examples as described above.

<Dehumidification Performance>

The dehumidification performance was evaluated as follows. First, the moisture releasing process and the moisture absorbing process were sequentially performed under conditions of an indoor temperature of 25° C. and a relative humidity of 40%. In the moisture releasing process, a voltage of 12 V was applied to the heater element for 4 minutes using a DC power supply device while blowing the air at 20 L/min using an air blower. In the moisture absorbing process, the air was blown at 300 L/min using an air blower for 4 minutes without applying any voltage. At this time, the absolute humidity was recorded by humidity sensors placed before and after the heater element, and the amount of water removed during the moisture absorbing process was measured.

In this evaluation, the amount of water removed during the moisture absorbing process of Comparative Example 1 was used as a reference, and an improvement rate of the amount of the moisture removed during the moisture absorbing process of each of Examples and Comparative Examples with respect to the reference (calculation formula: the amount of water removed during the moisture absorbing process in each of Examples and Comparative Examples/the amount of water removed during the moisture absorbing process in Comparative Example 1×100-100) was determined. A case where the improvement rate was 5% or more is represented by A, and a case where the improvement rate was less than 5% and 3% or more is represented by B.

<Electrical Resistance Life>

The electrical resistance life was evaluated as follows. First, the moisture releasing process and the moisture absorbing process were repeatedly performed under conditions of an indoor temperature of 25° C. and a relative humidity of 70%. In the moisture releasing process, a voltage of 20 V was applied to the heater element for 4 minutes using a DC power supply device while blowing the air at 20 L/min using an air blower. In the moisture absorbing process, the air was blown at 300 L/min using an air blower for 4 minutes without applying any voltage. A test was conducted in which such the moisture releasing process and the moisture absorbing process were repeated, and the time when the electrical resistance at room temperature increased by 30% or more as compared to the electrical resistance before the test was recorded as the life.

In this evaluation, the life of Comparative Example 1 was used as a reference, and an improvement rate of the life of each of Examples and Comparative Examples with respect to the reference (calculation formula: the life of each of Examples and Comparative Examples/the life of Comparative Example 1×100-100) was determined. A case where the improvement rate was 35% or more is represented by A, a case where the improvement rate was less than 35% and 30% or more is represented by B, a case where the improvement rate was less than 30% and 25% or more is represented by C, a case where the improvement rate was less than 25% and 20% or more is represented by D, and a case where the improvement rate was less than 20% and 15% or more is represented by E.

<Ventilation Resistance (Pressure Loss)>

The ventilation resistance was determined by placing the heater element in a wind tunnel, blowing air at 50 $m^3$/h under conditions of an indoor temperature of 25° C. and 1 atm, and evaluating the pressure loss from differential pressure gauges before and after the heater element.

In this evaluation, the pressure losses of Examples 1 to 12 and Comparative Examples 1 and 2 were equivalent (good). Therefore, using the results of these pressure losses as references, an increase rate (calculation formula: the pressure losses of Examples 13 to 15/the pressure loss of Example 1 and the like×100-100) of the pressure losses of Examples 13 to 15 with respect to the references was determined. The results of Examples 1 to 12 and Comparative Examples 1 to 2 as the references are represented by A, those in which the increase rate was 10% or less are represented by B, and those in which the increase rate was more than 10% and 20% or less are represented by C.

<Strength>

The strength was evaluated in accordance with the four-point bending method of "bending test" in JIS R1601:2008.

In this evaluation, since the strengths of Examples 1 to 10, 12 and 13, and Comparative Examples 1 to 2 were equivalent (good), these results were used as references, and a rate of variability in the results of other Examples with respect to the references (calculation formula: the strength of other Examples/the strength of Example 1 and the like×100-100) was determined. The results of Examples 1 to 10, 12 and 13 and Comparative Examples 1 to 2 as the references are represented by B, those in which the rate of variability showed an increase rate of 10% or more is represented by A, and those in which the rate of variability showed a decrease rate of 10% or more is represented by C.

The above evaluation results are shown in Table 1.

TABLE 1

| | Electrode on inlet End Face Side | Thickness of Functional Material-Containing Layer (μm) A1 | A2 | B1, B2 | Thickness of Partition Wall (μm) | Dehumidification Performance | Electrical Resistance Life | Ventilation Resistance | Strength |
|---|---|---|---|---|---|---|---|---|---|
| Comp. 1 | Positive Electrode | 0 | 0 | 200 | 130 | — | E | A | B |
| Comp. 2 | Positive Electrode | 400 | 400 | 200 | 130 | A | — | A | B |
| Ex. 1 | Negative Electrode | 400 | 400 | 200 | 130 | A | D | A | B |
| Ex. 2 | Negative Electrode | 300 | 300 | 200 | 130 | A | C | A | C |
| Ex. 3 | Negative Electrode | 200 | 200 | 200 | 130 | A | B | A | B |
| Ex. 4 | Negative Electrode | 100 | 100 | 200 | 130 | B | B | A | B |
| Ex. 5 | Negative Electrode | 50 | 50 | 200 | 130 | B | B | A | B |
| Ex. 6 | Negative Electrode | 0 | 100 | 200 | 130 | B | B | A | B |
| Ex. 7 | Negative Electrode | 10 | 100 | 200 | 130 | B | B | A | B |
| Ex. 8 | Negative Electrode | 100 | 500 | 200 | 130 | A | B | A | B |
| Ex. 9 | Negative Electrode | 200 | 400 | 200 | 130 | A | B | A | B |
| Ex. 10 | Negative Electrode | 300 | 50 | 200 | 130 | B | C | A | B |
| Ex. 11 | Negative Electrode | 200 | 200 | 200 | 50 | A | C | A | C |
| Ex. 12 | Negative Electrode | 200 | 200 | 200 | 80 | A | C | A | B |
| Ex. 13 | Negative Electrode | 200 | 200 | 200 | 300 | A | C | B | B |
| Ex. 14 | Negative Electrode | 200 | 200 | 200 | 500 | B | C | B | A |
| Ex. 15 | Negative Electrode | 200 | 200 | 200 | 570 | B | C | C | A |

A1 is a negative electrode portion provided on the inlet end face (however, for Comp. 1 and 2, a positive electrode portion).

A2 is a positive electrode portion provided on the outlet end face (however, for Comp. 1 and 2, a negative electrode portion).

B1 is a negative electrode portion provided on the surfaces of the partition walls in the extending direction of the flow path from the inlet end face (however, for Comp. 1 and 2, a positive electrode portion).

B2 is a positive electrode portion provided on the surfaces of the partition walls in the extending direction of the flow path from the outlet end face (however, for Comp. 1 and 2, a negative electrode portion).

As shown in Table 1, the heater elements according to Examples 1 to 15 in which the negative electrode was provided on the inlet end face side and the positive electrode was provided on the outlet end face side of the honeycomb structure had good dehumidification performance results. Therefore, it can be said that they can effectively heat the dehumidifying material. Further, the heater elements according to Examples 1 to 15 had also good electrical resistance life results. Therefore, it can be said that the electrical resistance is difficult to increase even if they are used for a long period of time. Furthermore, by controlling the thickness of the partition walls of the honeycomb structure within the range of 80 to 500 μm, the ventilation resistance (pressure loss) could be suppressed and the strength was also good.

On the other hand, the heating elements according to Comparative Examples 1 and 2 had the positive electrode on the inlet end face side and the negative electrode on the outlet end face side of the honeycomb structure, so that the electrical resistance life was insufficient.

As can be seen from the above results, according to the present invention, it is possible to provide an inexpensive heater element which does not easily increase the electrical resistance even if it is used for a long period of time, while widening a region in an extending direction of a flow path where a functional material can effectively be heated.

DESCRIPTION OF REFERENCE NUMERALS

10 honeycomb structure
11 outer peripheral wall
12*a* inlet end face
12*b* outlet end face
13 cell
13*a* side portion
13*b* corner portion
14 partition wall
20 negative electrode
30 positive electrode
40 functional material-containing layer
50 terminal
100, 110, 120 heater element
200 power supply
300 switching valve
310 rotation shaft
312 opening/closing door
314 actuator
400 inflow pipe
500 outflow pipe
500*a* first path
500*b* second path
600 ventilator
810, 820, 830 electric wire
900 control unit
910 power switch
1000 vehicle air conditioning system

The invention claimed is:

1. A heater element, comprising:

a honeycomb structure comprising an outer peripheral wall and partition walls disposed on an inner side of the outer peripheral wall, the partition walls defining a plurality of cells, each of the cells extending from an inlet end face to an outlet end face to form a flow path, at least the partition walls being made of a material having a PTC property;

a negative electrode comprising a negative electrode portion A1 provided on the inlet end face, and a negative electrode portion B1 connected to the negative electrode portion A1 and provided on surfaces of the partition walls in an extending direction of the flow path from the inlet end face;

a positive electrode comprising a positive electrode portion A2 provided on the outlet end face, and a positive electrode portion B2 connected to the positive electrode portion A2 and provided on surfaces of the partition walls in the extending direction of the flow path from the outlet end face; and a functional material-containing layer comprising at least a dehumidifying material, the functional material-containing layer being provided on surfaces of the partition walls where the negative electrode portion B1 and the positive electrode portion B2 are not provided, and on surfaces of the negative electrode portion B1 and the negative electrode portion B2.

2. The heater element according to claim 1, wherein the functional material-containing layer is also provided on surfaces of at least part of the negative electrode portion A1 and the positive electrode portion A2.

3. The heater element according to claim 2, wherein a thickness of the functional material-containing layer provided on the surface of the positive electrode portion A2 is greater than that of the functional material-containing layer provided on the surface of the negative electrode portion A1.

4. The heater element according to claim 2, wherein the thickness of the functional material-containing layer provided on the surface of the negative electrode portion A1 is 300 μm or less.

5. The heater element according to claim 1, wherein the partition walls of the honeycomb structure have a thickness of 80 to 500 μm.

6. The heater element according to claim 1, wherein the negative electrode and the positive electrode are made of a material containing one or more selected from aluminum, stainless steel, nickel, silver, and copper.

7. The heater element according to claim 1, wherein the material having the PTC property comprises a material containing barium titanate as a main component, the material being substantially free of lead.

8. The heater element according to claim 1, wherein the functional material-containing layer further comprises a functional material capable of adsorbing one or more selected from carbon dioxide and volatile components.

9. The heater element according to claim 1, further comprising terminals provided on surfaces of at least part of the negative electrode portion A1 and the positive electrode portion A2.

10. The heater element according to claim 9, wherein the terminals are made of a material containing one or more selected from aluminum, stainless steel, nickel, silver, and copper.

11. A vehicle air conditioning system, comprising:

the heater element according to claim 1;

a power supply for applying a voltage to the heater element;

an inflow pipe for communicating a vehicle interior with the inlet end face of the heater element;

an outflow pipe for communicating the outlet end face of the heater element with the vehicle interior and a vehicle exterior; and a switching valve provided in the outflow pipe, the switching valve being capable of switching a flow of an air flowing through the outflow pipe to the vehicle interior or the vehicle exterior.

12. The vehicle air conditioning system according to claim 11, further comprising a ventilator for causing the air from the vehicle interior to flow into the inlet end face of the heater element through the inflow pipe.

13. The vehicle air conditioning system according to claim 11, further comprising a control unit capable of executing switching between:

a first mode wherein the voltage applied from the power supply is turned off, and the switching valve is switched such that the air flowing through the outflow pipe flows into the vehicle interior; and a second mode wherein the voltage applied from the power supply is turned on, and the switching valve is switched such that the air flowing through the outflow pipe flows to the vehicle exterior.

* * * * *